(12) United States Patent
Park et al.

(10) Patent No.: US 11,618,164 B2
(45) Date of Patent: Apr. 4, 2023

(54) ROBOT AND METHOD OF CONTROLLING SAME

(71) Applicant: LG ELECTRONICS INC., Seoul (KR)

(72) Inventors: Jonghun Park, Seoul (KR); Changeui Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 16/838,565

(22) Filed: Apr. 2, 2020

(65) Prior Publication Data

US 2021/0107156 A1  Apr. 15, 2021

(30) Foreign Application Priority Data

Oct. 15, 2019 (KR) .......... 10-2019-0127674
Nov. 20, 2019 (KR) .......... 10-2019-0149795

(51) Int. Cl.
  *B25J 9/16* (2006.01)
(52) U.S. Cl.
  CPC ... *B25J 9/1666* (2013.01); *G05B 2219/40476* (2013.01); *G05B 2219/40477* (2013.01)
(58) Field of Classification Search
  CPC ...... B25J 9/1664; B25J 9/1666; B25J 9/1676; G05B 2219/40476; G05B 2219/40477; G05B 2219/40478
  See application file for complete search history.

(56) References Cited

U.S. PATENT DOCUMENTS

| 5,343,385 A | * | 8/1994 | Joskowicz | .............. G06F 30/18 700/255 |
| 2010/0161124 A1 | * | 6/2010 | Kimura | .................. B25J 9/1666 700/251 |
| 2021/0059781 A1 | * | 3/2021 | Peine | ..................... B25J 9/1676 |

FOREIGN PATENT DOCUMENTS

| EP | 2048557 A1 | * | 4/2009 | .............. F16P 3/142 |
| JP | 2000174092 A | * | 6/2000 | |
| KR | 101784500 B1 | * | 10/2017 | |

OTHER PUBLICATIONS

Liu et al., "Laser tracker based robotic assembly system for large scale peg-hole parts," Jun. 2014, IEEE International Conference on Cyber Technology in Automation, Control and Intelligence Systems, pp. 574-578 (Year: 2014).*

* cited by examiner

*Primary Examiner* — Spencer D Patton
(74) *Attorney, Agent, or Firm* — Birch, Stewart, Kolasch & Birch, LLP

(57) ABSTRACT

Disclosed is a robot including a manipulator for moving a tool; and a processor for controlling the manipulator, setting a boundary, generating a first path in response to a received execution instruction, generating a second path that does not extend beyond the boundary based on the first path and the boundary, and controlling the manipulator based on the second path.

16 Claims, 15 Drawing Sheets

ROBOT AND METHOD OF CONTROLLING SAME

CROSS REFERENCE TO RELATED APPLICATION

The present application claims priorities to Korean Patent Application No. 10-2019-0127674, filed in the Republic of Korea on Oct. 15, 2019, and Korean Patent Application No. 10-2019-0149795, filed in the Republic of Korea on Nov. 20, 2019, the entire contents of all of these applications are incorporated herein in their entirety for all purposes by this reference.

BACKGROUND OF THE INVENTION

Field of the Invention

Embodiments of the present disclosure relate to a robot and a control method for the robot.

DESCRIPTION OF THE RELATED ART

Generally, a robot is a machine capable of automatically carrying out or performing a given operation by its own ability, and the robot is variably used in the industrial field, medical field, household, military field, marine field, etc. Recently, a communication type robot capable of performing communication or interaction with persons through voice or gesture has been increased.

Also, a robot providing foods to a user has introduced. For example, a robot capable of scooping out food from a specific container and providing the same to a user or a robot capable of making foods according to a recipe has been developed. However, precise and delicate manipulations are required for providing or making foods, and thus controlling a robot has to become more precise.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present disclosure has been made keeping in mind the above problems occurring in the related art, and the present invention is intended to provide a robot, and a method of controlling the robot, wherein the robot moves so as not to go beyond a preset boundary, particularly, not to go beyond the boundary by correcting a generated path that goes beyond the boundary.

According to embodiments of the present disclosure, a robot includes: a manipulator configured to move a tool; and a processor configured to control the manipulator, wherein the processor: sets a boundary, and generates a first path in response to a received execution instruction; when the generated first path goes beyond the boundary, generates a second path that does not go beyond the boundary on the basis (e.g., based on) of the first path and the boundary; and controls the manipulator on the basis of the second path According to embodiments of the present disclosure, a method of controlling a robot, wherein the robot performs an operation by using a manipulator configured to move a tool, includes: setting a boundary; generating a first path in response to a received execution instruction; determining whether or not the generated first path goes beyond the boundary; when the generated first path goes beyond the boundary, generating a second path that does not go beyond the boundary on the basis of the first path and the boundary; and controlling the manipulator on the basis of the second path.

According to embodiments of the present disclosure, a robot includes: a manipulator configured to move a tool; and a processor configured to control the manipulator, wherein the processor: sets a boundary related to movements of the tool; generates a collision-free path that does not go beyond the boundary on the basis of the boundary; and controls the manipulator on the basis of the collision-free path.

According to embodiments of the present disclosure, a computer program including instructions for controlling a robot can be stored in a computer-readable storage medium.

According to embodiments of the present disclosure, the robot performs operations within a set boundary range, and thus the possibility of damage or breakage of the robot due to a collision with an object around the robot can be reduced.

According to embodiments of the present disclosure, the robot performs operations within the boundary while not going beyond the set boundary, and thus the efficiency of operational movements of the robot can be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
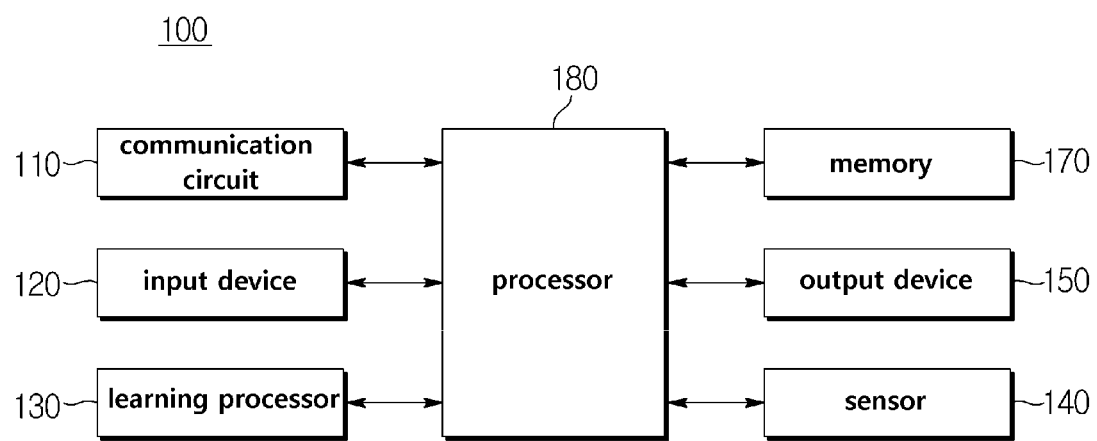
FIG. 1 is a view showing an AI apparatus according to an embodiment of the present disclosure.

Hereinafter, embodiments of the present disclosure will be described with reference to the accompanied drawings.

Artificial intelligence refers to the field of researching artificial intelligence or the methodology to create the same, and machine learning refers to the field of defining various problems in the field of artificial intelligence and researching the methodology for solving the problems. Machine learning is defined as an algorithm that improves the performance of an operation by performing a consistent experience for the operation.

An artificial neural network (ANN) is a model used in machine learning, configured with artificial neurons (nodes) constituting a network in a synapse coupling, and means a model with problem solving ability. The artificial neural network can be defined by a connection pattern between neurons of other layers, a learning process of updating a model parameter, and an activation function generating an output value.

The artificial neural network can include an input layer, an output layer, and at least one selective hidden layer. Each layer can include at least one neuron, and the artificial neural network can include a synapse that connects neurons. In the artificial neural network, each neuron can output input signals input through a synapse, weights, and a function value of an activation function for a bias.

The model parameter means a parameter determined through learning, and includes a weight of a synapse connection, a bias of a neuron, etc. In addition, a hyper-parameter means a parameter that has to be set before performing learning in a machine learning algorithm, and includes a learning rate, a number of repetition times, a size of a mini-batch, an initialization function, etc.

An objective of performing learning for an artificial neural network is to determine a model parameter that minimizes a loss function. The loss function can be used as an index for determining an optimum model parameter in a learning process of the artificial neural network.

Machine learning can be classified into supervised learning, unsupervised learning, and reinforcement learning according to a learning method.

Supervised learning can mean a method of performing learning for an artificial neural network where a label related to learning data is provided, and the label can mean a right answer (or result value) that has to be estimated by the artificial neural network when the learning data is input to the artificial neural network. Unsupervised learning can mean a method of performing learning for an artificial neural network where a label related to learning data is not provided. Reinforcement learning can mean a learning method performing learning so as to select, by an agent defined under a certain environment, an action or an order thereof such that an accumulated reward in each state is maximized.

Machine learning, among artificial neural networks, employed in a deep neural network (DNN) including a plurality of hidden layers, is referred to as deep learning, and the deep learning is a part of the machine learning. Hereinafter, machine learning is used to include deep learning.

A robot can mean a machine capable of automatically carrying out or operating a given operation by its own ability. Particularly, a robot having a function of recognizing an environment, and performing an operation by performing determination by itself can be referred to as an intelligent robot.

A robot can be classified into an industrial type, a medical type, a household type, a military type, etc. according to the usage purpose or field.

A robot can perform various physical operations such as moving a robot joint by including a manipulator including an actuator or motor. In addition, a movable robot can navigate on the ground or fly in the air by including wheels, brakes and propellers, turbines, etc.

Self-driving means the technology of autonomous driving, and a self-driving vehicle means a vehicle that drives without user's manipulations or with the minimum manipulation of the user.

For example, self-driving can include the technique of maintaining a driving lane, the technique of automatically adjusting a speed such as adaptive cruise control, the technique of automatically driving along a predetermined route, the technique of automatically setting a route when a destination is set, etc.

Vehicles can include a vehicle with only an internal combustion engine, a hybrid vehicle with an internal combustion engine and an electric motor together, and an electric vehicle with only an electric motor, and can include not only automobiles but also trains and motorcycles.

Herein, a self-driving vehicle can be referred to as a robot with a self-driving function.

Extended reality refers to virtual reality (VR), augmented reality (AR), and mixed reality (MR). The VR technique provides objects and backgrounds of the real world in CG images, the AR technique provides virtual CG images by reflecting the same on real object images, and the MR technique is a computer graphic technique mixing and coupling virtual objects and providing by reflecting the same in the real word.

The MR technique is similar to the AR technique in that real objects and virtual objects are provided together. In the AR technique, virtual objects are used to complement real objects, but in the MR technique, virtual objects and real objects are equivalently used.

The XR technique can be applied by using a head-mount display (HMD), a head-up display (HUD), a mobile phone, a tablet PC, a laptop PC, a desktop PC, a TV, a digital signage, etc., and a device to which the XR technique is applied can be referred to an XR device.

FIG. 1 is a view showing an AI apparatus 100 according to an embodiment of the present disclosure.

The AI apparatus 100 can be employed in a fixed or movable type device such as TVs, projectors, mobile phones, smart phones, desktop PCs, laptop PCs, digital broadcasting terminals, PDAs (personal digital assistants), PMPs (portable multimedia player), navigations, tablet PCs, wearable devices, set-top boxes (STB), DMB receiver, radios, washers, refrigerators, digital signages, robots, vehicles, etc.

Referring to FIG. 1, the AI apparatus 100 can include a communication circuit 110, an input device 120, a learning processor 130, a sensor 140, an output device 150, a memory 170, and a processor 180.

Figure 3:
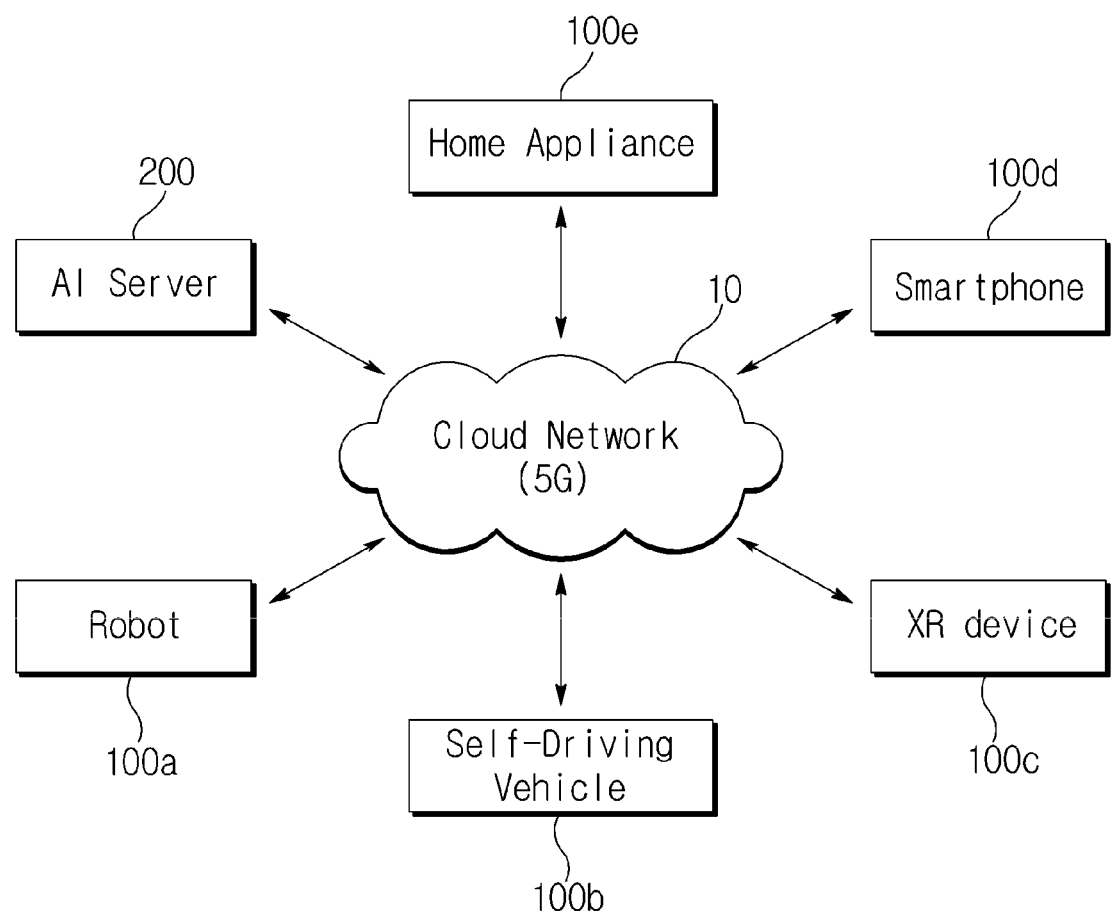
FIG. 3 is a view showing an AI system according to an embodiment of the present disclosure.

The communication circuit 110 can transmit and receive data to/from another AI apparatuses (100a to 100e) or external devices such as an AI sever 200 by using wired/wireless communication methods, as illustrated in FIG. 3. For example, the communication circuit 110 can transmit and receive sensor information, user input, learning model, control signals, etc. to/from external devices.

Herein, communication methods used by the communication circuit 110 include global system for mobile communication (GSM), code division multi access (CDMA), long term evolution (LTE), 3G, 4G, 5G, wireless LAN (WLAN), wireless-fidelity (Wi-Fi), Bluetooth™, radio frequency identification (RFID), infrared data association (IrDA), ZigBee, near field communication (NFC), etc.

The input device 120 can be for obtaining various types of data.

Herein, the input device 120 can include a camera for an image signal input, a microphone for receiving audio signals, and a user input part for receiving information from the user. Herein, signals obtained from the camera or microphone by using the same as sensors can be referred to as sensing data or sensor information.

The input device 120 can be for obtaining input data used for outputting that is performed by using learning data and a learning model for model learning. The input device 120 can be for obtaining input data that is not processed. Herein, the processor 180 or learning processor 130 can obtain an input feature from input data as preprocessing.

The learning processor 130 can perform learning for a model configured with an artificial neural network by using learning data. Herein, the artificial neural network for which learning is performed can be referred to as a learning model. The learning model can be used for estimating a result value for new input data other than learning data, and the estimated value can be used as a reference for performing a certain operation.

Figure 2:
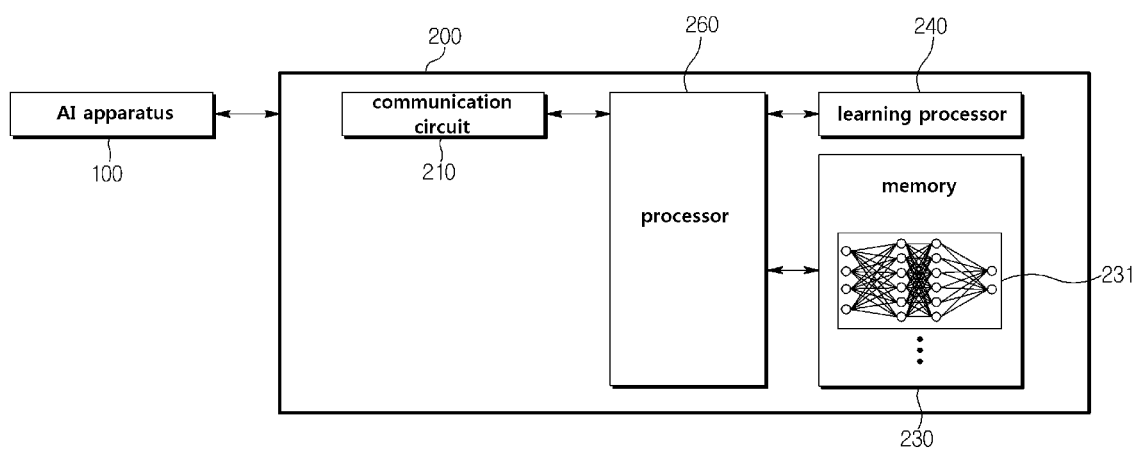
FIG. 2 is a view showing an AI sever according to an embodiment of the present disclosure.

Herein, the learning processor 130 can perform AI processing with a learning processor 240 of the AI sever 200, as shown in FIG. 2.

Herein, the learning processor 130 can be integrated in the AI apparatus 100 or can include a memory employed therein. Alternatively, the learning processor 130 can be employed by using the memory 170, an external memory directly connected to the AI apparatus 100, or a memory maintained in an external device.

The sensor 140 can obtain at least one of internal information of the AI apparatus 100, surrounding environmental information of the AI apparatus 100, and user information by using various sensors.

Herein, the sensor 140 can include a proximity sensor, an ambient light sensor, an acceleration sensor, a magnetic sensor, a gyro sensor, an inertial sensor, an RGB sensor, an IR sensor, a fingerprint recognizing sensor, an ultrasonic sensor, an optical sensor, a microphone, a lidar, a radar, etc.

The output device 150 can generate an output related to visual, auditory, or tactile.

Herein, the output device 150 can include a display for visually outputting information, a speaker for acoustically outputting information, and a haptic actuator for tactually outputting information. For example, the display can output an image or video, the speaker can output a voice or sound, and the haptic actuator can output vibration.

The memory 170 can be for storing data supporting various functions of the AI apparatus 100. For example, in the memory 170, input data obtained through the input device 120, learning data, a learning model, a learning history, etc. can be stored.

The processor 180 can determine at least one executable operation of the AI apparatus 100 which is determined on the basis of information determined or generated by using a data analysis algorithm or machine learning algorithm. In addition, the processor 180 can perform the determined operation by controlling components of the AI apparatus 100.

For the same, the processor 180 can make a request, retrieve, receive, or use data of the learning processor 130 or the memory 170, and control components of the AI apparatus 100 so as to perform the estimated operation of the at least one executable operation, or an operation that is determined to be desirable.

Herein, in order to perform the determined operation, the processor 180 can generate, when association with an external device is required, a control signal for controlling the corresponding external device, and transmit the generated control signal to the corresponding external device.

The processor 180 can obtain intention information on the user's input, and determine a user's requirement on the basis of the obtained intention information.

Herein, the processor 180 can obtain intention information in association with the user's input by using at least one of a STT (speech-to-text) engine converting a voice input into text strings, and a natural language processing (NLP) engine obtaining intention information of natural language.

Herein, a part of the at least one of the STT engine and the NLP engine can be configured with an artificial neural network for which learning is performed according to a machine learning algorithm. In addition, for at least one of the STT engine and the NLP engine, learning can be performed by the learning processor 130, learning can be is performed by the learning processor 240 of the AI sever 200, or learning can be performed through distribution processing of the above processors.

The processor 180 can collect record information including operation content of the AI apparatus 100 and user's feedback in association with the operation, etc. so as to store in the memory 170 or learning processor 130, or transmit the information to the external device such as an AI sever 200, etc. The collected record information can be used when updating a learning model.

The processor 180 can control a part of components of the AI apparatus 100 so as to execute application programs stored in the memory 170. Further, the processor 180 can operate components of the AI apparatus 100 by combining at least two thereof so as to execute the application programs.

Referring to FIG. 2, an AI sever 200 can mean a device performing learning for an artificial neural network by using a machine learning algorithm, or a device using the artificial neural network for which learning is performed. Herein, the AI sever 200 can perform distributed processing by being configured with a plurality of servers, or can be defined as a 5G network. Herein, the AI sever 200 can perform at least a part of AI processing by being included as a partial component of the AI apparatus 100.

The AI sever 200 can include a communication circuit 210, a memory 230, a learning processor 240, and a processor 260.

The communication circuit 210 can transmit and receive data to/from the external devices such as AI apparatus 100, etc.

The memory 230 can be for storing a model (or artificial neural network, 231) for which learning is ongoing or performed by the learning processor 240.

The learning processor 240 can perform learning for an artificial neural network 231a by using learning data. A learning model can be used by being integrated in the AI sever 200 of the artificial neural network, or by being integrated in the external device such as an AI apparatus 100, etc.

The learning model can be employed in hardware, software, or combination thereof. When a part or the entire of the learning model is employed in software, at least one instruction constituting the learning model can be stored in the memory 230.

The processor 260 can estimate a result value for new input data by using the learning model, and generate a response or control command on the basis of the estimated result value.

FIG. 3 is a view showing an AI system 1 according to an embodiment of the present disclosure.

Referring to FIG. 3, the AI system 1 is connected to at least one cloud network 10 among the AI sever 200, a robot 100a, self-driving vehicle 100b, an XR device 100c, a smart phone 100d, and a home appliance 100e. Herein, the robot 100a, the self-driving vehicle 100b, the XR device 100c, the smart phone 100d or the home appliance 100e to which the AI technique (as described above) is applied can be referred to as the AI apparatus (100a to 100e).

The cloud network 10 can mean a network constituting a part of cloud computing infrastructure or a network present in the cloud computing infrastructure. Herein, the cloud network 10 can be configured by using a 3G network, a 4G or LTE network, a 5G network, etc.

In other words, each device (100a to 100e, 200) constituting the AI system 1 can be connected with each other through the cloud network 10. Particularly, each device (100a to 100e, 200) can perform communication with each other through a base station, and also can perform direct communication without using the base station.

The AI sever 200 can include a server performing AI processing, and a sever performing calculation for big data.

The AI sever 200 can be connected to at least one of AI apparatus constituting an AI system 1 configured with the robot 100a, the self-driving vehicle 100b, the XR device 100c, the smart phone 100d, and the home appliance 100e through the cloud network 10, and the AI sever 200 can support a part of the AI processing of the connected AI apparatuses (100a to 100e).

Herein, the AI sever 200 can perform learning on an artificial neural network according to a machine learning algorithm in place of the AI apparatus (100a to 100e), can directly store a learning model, or transmit the learning model to the AI apparatus (100a to 100e).

Herein, the AI sever 200 can receive input data from the AI apparatus (100a to 100e), estimate a result value for the received input data by using a learning model, and generate a response or control command on the basis of the estimated result value so as to transmit the same to the AI apparatus (100a to 100e).

Alternatively, the AI apparatus (100a to 100e) can estimate a result value for the received input data by directly using a learning model, and generate a response or control command on the basis of the estimated result value.

Hereinafter, various examples of the AI apparatus (100a to 100e) to which the above described technique is applied will be described. Herein, the AI apparatus (100a to 100e) shown in FIG. 3 can be referred to a detailed example of the AI apparatus 100 shown in FIG. 1.

The robot 100a can be employed in a guide robot, a transport robot, a cleaning robot, a wearable robot, an entertainment robot, a pet robot, an unmanned flying robot, etc. by applying the AI technique thereto.

The robot 100a can include a robot control module for controlling operations, and the robot control module can mean a software module or a chip where the same is employed therein.

The robot 100a can obtain state information of the robot 100a, detect (recognize) a surrounding environment or objects, generate map data, determine a moving path or driving plan, determine a response in association with a user interaction, or determine operations by using sensor information that is obtained through various types of sensors.

Herein, in order to determine a moving path or driving plan, the robot 100a can use sensor information obtained by using at least one sensor of a lidar, a radar, and a camera.

The robot 100a can perform the above operations by using a learning model configured with at least one artificial neural network. For example, the robot 100a can recognize a surrounding environment and objects by using a learning model, and determine operations by using the recognized surrounding environment information or object information. Herein, the learning model can be obtained by directly performing learning by the robot 100a, or by performing learning by the external device such as an AI sever 200, etc.

Herein, the robot 100a can generate a result by directly using the learning model so as to perform operations. However, the robot 100a can transmit the sensor information to the external device such as an AI sever 200, and receive a result generated according thereto so as to perform operations.

The robot 100a can determine a moving path and a driving plan by using at least one map data, object information detected from the sensor information, and object information obtained from the external device, and drive according to the determined moving path and the driving plan by controlling a driving part.

Map data can include object identification information on various objects arranged in a space where the robot 100a moves. For example, the map data can include object identification information on fixed objects such as walls, doors, etc., and movable objects such as flowerpots, tables, etc. In addition, the object identification information can include a name, a type, a distance, a position, etc.

In addition, the robot 100a can perform operations or drive by controlling the driving part on the basis of the user's control/interaction. Herein, the robot 100a can obtain intention information on interaction according to a user's behavior or voice input, and determine a response on the basis of the obtained intention information so as to perform operations.

The self-driving vehicle 100b can be employed as a movable robot, a vehicle, an unmanned flying robot, etc. by applying the AI technique thereto.

The self-driving vehicle 100b can include a self-driving control module controlling a self-driving function, and the self-driving control module can mean a software module or a chip where the same is employed in hardware. The self-driving control module can be included in the self-driving vehicle 100b as a component thereof, but can be connected to the self-driving vehicle 100b by being configured in separate hardware.

The self-driving vehicle 100b can obtain state information of the self-driving vehicle 100b, detect (recognize) a surrounding environment and (surrounding) objects, generate map data, determine a moving path and a driving plan, and/or determine operations by using sensor information obtained through various types of sensors.

Herein, in order to determine a moving path or driving plan, the self-driving vehicle 100b, similar to the robot 100a, can use sensor information obtained by using at least one sensor of a lidar, a radar, and a camera.

Particularly, the self-driving vehicle 100b can recognize an environment and objects for areas that are hidden from view or over a certain distance by receiving sensor information from external devices, or by receiving information directly recognized from the external devices.

The self-driving vehicle 100b can perform the above operations by using a learning model configured with at least one artificial neural network. For example, the self-driving vehicle 100b can recognize a surrounding environment and objects by using a learning model, and determine a driving path by using the recognized surrounding environment information or object information. Herein, the learning model can be obtained by directly performing learning by the self-driving vehicle 100b, or by performing learning by the external device such as an AI sever 200, etc.

Herein, the self-driving vehicle 100b can generate a result by directly using the learning model so as to perform operations. However, the self-driving vehicle 100b can transmit the sensor information to the external device such as an AI sever 200, and receive a result generated according thereto so as to perform operations.

The self-driving vehicle 100b can determine a moving path and a driving plan by using at least one map data, object information detected from the sensor information, and object information obtained from the external device, and drive according to the determined moving path and the driving plan by controlling a driving part.

Map data can include object identification information on various objects (for example, roads, paths, hallways) arranged in a space where the self-driving vehicle 100b drives. For example, the map data can include object identification information on fixed objects such as street lamps, rocks, buildings, etc. and movable objects such as vehicles, pedestrians, etc. In addition, the object identification information can include a name, a type, a distance, a position, etc.

In addition, the self-driving vehicle 100b can perform operations or drive by controlling the driving part on the basis of the user's control/interaction. Herein, the self-driving vehicle 100b can obtain intention information on interaction according to a user's behavior or voice input, and determine a response on the basis of the obtained intention information so as to perform operations.

The XR device 100c can be employed by using a HMD, a HUD provided in a vehicle, a TV, a mobile phone, a smart phone, a PC, a wearable device, a home appliance, a digital signage, a vehicle, or a fixed type robot or movable type robot.

The XR device 100c can analyze 3D point cloud data or image data which is obtained through various sensors or external devices, generate position data and feature data on 3D points, and obtain information on a surrounding space and real objects and output XR objects to be rendered. For example, the XR device 100c can output XR objects including additional information on the recognized objects by reflecting the same in the corresponding recognized objects.

The XR device 100c can perform the above operations by using a learning model configured with at least one artificial neural network. For example, the XR device 100c can recognize real objects from 3D point cloud data or image data by using a learning model, and provide information in association with the recognized real objects. Herein, the learning model can be obtained by directly performing learning by the XR device 100c, or by performing learning by the external device such as an AI sever 200, etc.

Herein, the XR device 100c can generate a result by directly using the learning model so as to perform operations. However, the XR device 100c can transmit the sensor information to the external device such as an AI sever 200, and receive a result generated according thereto so as to perform operations.

The robot 100a can be employed in a guide robot, a transport robot, a cleaning robot, a wearable robot, an entertainment robot, a pet robot, an unmanned flying robot, etc. by applying the AI technique and the self-driving technique thereto.

The robot 100a to which the AI technique and the self-driving technique are applied can mean a robot itself with a self-driving function, or the robot 100a operating in conjunction with the self-driving vehicle 100b.

The robot 100a with the self-driving function can refer to all devices moving by itself according to a given movement, or by determining a moving path by itself without a user control.

The robot 100a and the self-driving vehicle 100b which respectively have self-driving functions can use a common sensing method for determining at least one of a moving path and a driving plan. For example, the robot 100a and the self-driving vehicle 100b which respectively have self-driving functions can determine a moving path or driving plan by using information sensed through a lidar, a radar, a camera, etc.

The robot 100a operating in conjunction with the self-driving vehicle 100b can be present separate from the self-driving vehicle 100b, while the robot 100a is internally or externally connected to the self-driving function of the self-driving vehicle 100b, or can perform operations in association with the driver of the self-driving vehicle 100b.

Herein, the robot 100a operating in conjunction with the self-driving vehicle 100b can obtain sensor information in place of the self-driving vehicle 100b so as to provide the information to the self-driving vehicle 100b, or obtain sensor information and generate surrounding environment information or object information so as to provide the information to the self-driving vehicle 100b, and thus control or supplement the self-driving function of the self-driving vehicle 100b.

Alternatively, the robot 100a operating in conjunction with the self-driving vehicle 100b can monitor a driver of the self-driving vehicle 100b, or control functions of the self-driving vehicle 100b by operating in conjunction with the driver. For example, when it is determined that the driver is drowsy, the robot 100a can activate the self-driving function of the self-driving vehicle 100b or control the driving part of the self-driving vehicle 100b. Herein, functions of the self-driving vehicle 100b which are controlled by the robot 100a include, in addition to the self-driving function, functions provided from a navigation system or audio system provided in the self-driving vehicle 100b.

Alternatively, the robot 100a operating in conjunction with the self-driving vehicle 100b can provide information or supplement functions of the self-driving vehicle 100b from the outside of the self-driving vehicle 100b. For example, the robot 100a can provide traffic information including signal information such as smart signals to the self-driving vehicle 100b, or can automatically connect to an electrical charging device such as an automatic electric charger of an electric vehicle by operating in conjunction with the self-driving vehicle 100b.

The robot 100a can be employed in a guide robot, a transport robot, a cleaning robot, a wearable robot, an entertainment robot, a pet robot, an unmanned flying robot, a drone, etc. by applying the AI technique and the XR technique thereto.

The robot 100a to which the XR technique is applied can mean a robot that becomes a target controlled/operated within an XR image. Herein, the robot 100a can be distinguished from the XR device 100c and operate in conjunction with the same.

For the robot 100a that becomes a target controlled/operated within an XR image, when sensor information is obtained from sensors including a camera, the robot 100a or the XR device 100c can generate an XR image on the basis of the sensor information, and the XR device 100c can output the generated XR image. In addition, the above robot 100a can operate on the basis of a control signal input through the XR device 100c, or in conjunction with the user.

For example, the user can check an XR image in association with a view of the robot 100a that is in conjunction with the external device such as XR device 100c in a remote manner, adjust a self-driving path of the robot 100a through in conjunction with the robot 100a, control operations or driving, or check information on surrounding objects.

The self-driving vehicle 100b can be employed in a movable robot, a vehicle, an unmanned flying robot, etc. by applying the AI technique and the XR technique thereto.

The self-driving vehicle 100b to which the XR technique is applied can mean self-driving vehicle provided with a device providing an XR image, and self-driving vehicle that becomes a target controlled/operated within an XR image, etc. Particularly, the self-driving vehicle 100b that becomes a target controlled/operated within an XR image can be distinguished from the XR device 100c, and operate in conjunction with the same.

The self-driving vehicle 100b provided with a device providing an XR image can obtain sensor information from sensors including a camera, and output an XR image generated on the basis of the obtained sensor information. For example, the self-driving vehicle 100b outputs an XR image by using a HUD, and thus provides to a passenger a real object or XR object in association with objects within a screen.

Herein, when the XR object is displayed on the HUD, at least a part of the XR object can be displayed to overlap the real object to which the passenger's eyes are directed. On the other hands, when the XR object displayed on a display included in the self-driving vehicle 100b, at least a part of the XR object can be displayed to overlap an object within the screen. For example, the self-driving vehicle 100b can output XR objects in association with carriageways, other vehicles, signals, traffic signs, motorcycles, pedestrians, buildings, etc.

For the self-driving vehicle 100b that becomes a target controlled/operated within an XR image, when sensor information is obtained from sensors including a camera, the self-driving vehicle 100b or XR device 100c can generate an XR image on the basis of the sensor information, and the XR device 100c can output the generated XR image. In addition, the above self-driving vehicle 100b can operate on the basis of a control signal input through the external device such as XR device 100c, etc. or in conjunction with the user.

Figure 4:
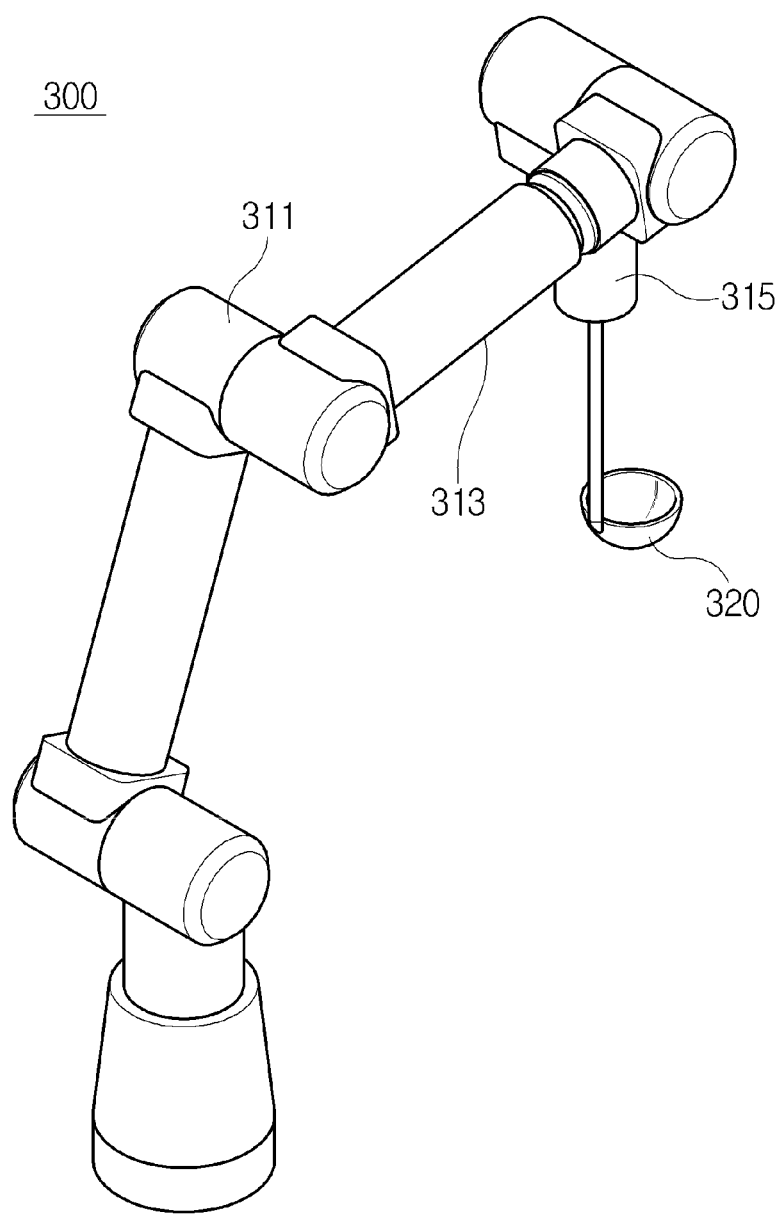
FIG. 4 is a view showing a robot according to embodiments of the present disclosure.

FIG. 4 is a view showing a robot according to embodiments of the present disclosure. Referring to FIGS. 1 to 4, a robot 300 can mean an apparatus capable of performing operations according to an execution instruction. The robot 300 shown in FIG. 4 can be configured to perform functions of the AI apparatus 100 described with reference to FIGS. 1 to 3, but it is not limited thereto. For example, the robot 300 can be configured to perform at least one of functions of the AI apparatus 100.

The robot 300 can include a manipulator 310 and a tool 320 coupled to the manipulator 310. According to embodiments, robot 300 can control the manipulator 310, and perform operations by using movements of the manipulator 310. For example, the robot 300 can move the tool 320 to a specific location by using the manipulator 310, and perform various operations by using the tool 320.

The robot 300 can receive an execution instruction, and control the manipulator 310 in response to the execution instruction. According to embodiments, the robot 300 can load a prestored scheduler on the basis of an execution instruction, determine an operation to be performed on the basis of the loaded scheduler, and control the manipulator 310 to perform the determined operation.

The manipulator 310 can be configured to perform mechanical operations. According to embodiments, the manipulator 310 can move in six-degree-of-freedom motion.

The manipulator 310 can be an articulated robotic arm that includes joints 311, links 313 disposed between the joints 311, and an end effector 315.

The joint 311 can move the manipulator 310. According to embodiments, the joint 311 can move the link 313 coupled to the joint 311 through translation or rotation motion. According to embodiments, the link 313 can linearly move or rotate as the joint 311 moves. For example, the joint 311 can include a driving motor, and moves by the driving motor. The driving motor can operate in response to an instruction that is transmitted thereto.

The link 313 can be disposed between the joints 311 or between the joint 311 and the end effector 315. The link 313 moves as the joint 311 moves. According to embodiments, the link 313 can perform translation or rotation motions.

The end effector 315 can be disposed at the end of the manipulator 310. The end effector 315 can perform a specific operation according to a control of the processor 350 or manipulator 310, or connect the manipulator 310 and the tool 320. According to embodiments, similar to the link 313, the end effector can move as the joint 311 moves.

The tool 320 can be a tool for performing an operation of the robot 300. According to embodiments, the robot 300 can be a device capable of performing operations required for cooking, and the tool 320 can mean a cooking tool. However, operation types of the robot 300 are not limited to embodiments of the present disclosure.

The tool 320 can be combined with the manipulator 310. According to embodiments, the tool 320 can be coupled to the end effector 315 of the robot 300, and move according to a control of the manipulator 310. The tool 320 can move according to a control of the manipulator 310 by being coupled with the manipulator 310.

According to embodiments, the tool 320 can be employed by being integrated with the manipulator 310 or by being separated from the manipulator 310. In the present specification, the tool 320 is generally included in the manipulator 310.

The manipulator 310 can control the tool 320 to move. The tool 320 can move with the manipulator 310, but it is not limited thereto. The tool 320 can be separated from the manipulator 310 and move according to a control of the manipulator 310. Accordingly, in the present specification, moving the tool 320 can be a concept of moving the tool 320 with the manipulator 310 or moving the tool 320 itself. In other words, moving the tool 320 by the manipulator 310 includes that the manipulator 310 moves with the tool 320, as well as separately moving the tool 320 according to a control of the manipulator 310.

The robot 300 can determine a location or positioning of the manipulator 310 and/or tool 320, generate an instruction for moving the manipulator 310 and/or tool 320 to the determined location and positioning, and control the manipulator 310 and/or tool 320 on the basis of the generated instruction. According to embodiments, the robot 300 can move the manipulator 310 and/or tool 320 from a first point to a second point.

According to embodiments, the robot 300 can control movements of the manipulator 310 and/or tool 320 on a joint space (or angular space). For example, the robot 300 can control movements of the manipulator 310 and/or tool 320 by controlling rotation angles of the joints 311. The manipulator 310 can receive an instruction including information on an angle for movement, and move on the basis of the angular information.

According to embodiments, the robot 300 can control movements of the manipulator 310 and/or tool 320 on a coordinate space. For example, the robot 300 can control movements of the manipulator 310 and/or tool 320 by controlling coordinates of the link 313 or end effector 315. The manipulator 310 can receive an instruction including information on coordinates for movements, and move on the basis of the coordinate information.

In addition, the robot 300 can generate a path for moving the manipulator 310 and/or tool 320 to a specific location, and generate a trajectory according to the path. The trajectory can include a path and movement information (for example, velocity, acceleration, angular acceleration, angular velocity, etc.) on the path.

The path means a route representing movements of the manipulator 310 and/or tool 320. Meanwhile, paths for respective points on the manipulator 310 and/or tool 320 may not be identical. According to embodiments, the robot 300 can generate a path for moving a point of interest, among points on the manipulator 310 and/or tool 320, to a specific location. For example, the path can mean a route of the outermost point of tool 320.

According to embodiments, the robot 300 can set a first point, a second point, and a plurality of stopover points between the first point and the second point when moving the manipulator 310 and/or tool 320 from the first point to the second point, and generate a path passing the first point, the second point, and the plurality of stopover points.

For example, the robot 300 can calculate rotation angles of joints 311 at the respective first point, second point, and plurality of stopover points, rotate the joints 311 according to the calculated rotation angles so as to move the manipulator 310 and/or tool 320 from the first point to the second point, but it is not limited thereto.

For example, the robot 300 can calculate coordinates in the respective first point, second point and plurality of stopover points, move the link 313 and/or end effector 315 according to the calculated coordinates so as to move the manipulator 310 and/or tool 320 from the first point to the second point, but it is not limited thereto.

A path of the manipulator 310 generated by the robot 300 can include at least one of information on movement coordinates and information on rotation angles of the joints.

Figure 5:
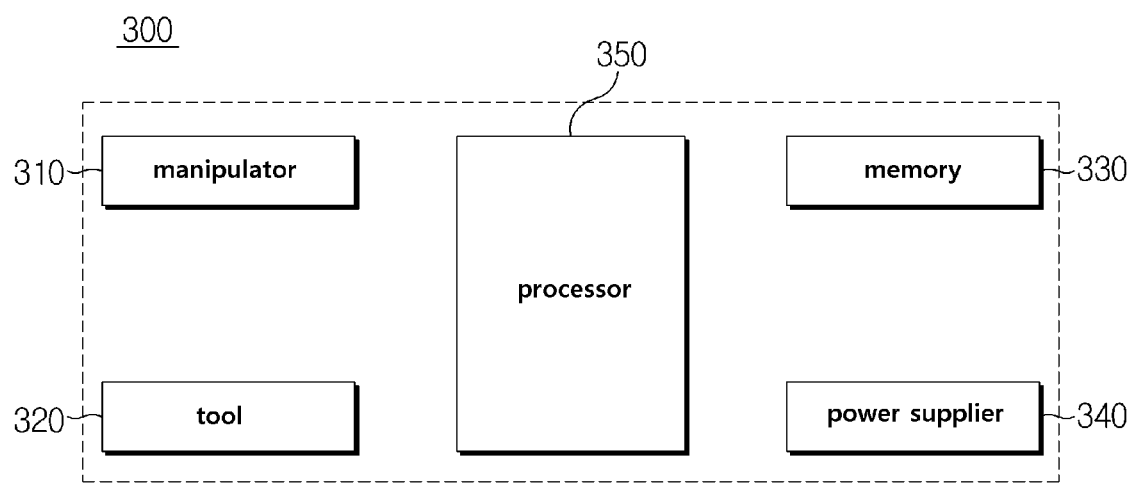
FIG. 5 is a view conceptually showing the robot according to embodiments of the present disclosure.

FIG. 5 is a view conceptually showing the robot according to embodiments of the present disclosure. Referring to FIGS. 1 to 5, the robot 300 can include a manipulator 310, a tool 320, a memory 330, a power supplier 340, and a processor 350. Meanwhile, although the processor 350 is included in the robot 300 in FIG. 5, according to embodiments, the processor 350 can be present in the outside of the robot 300. For example, the processor 350 can be included in a server outside of the robot 300.

The memory 330 can be for storing data required for operating the robot 300. According to embodiments, the memory 330 can include at least one of a non-volatile memory device and a volatile memory device.

The power supplier 340 can be configured to supply power required for operating the robot 300. According to embodiments, the power supplier 340 can supply power to each component of the robot 300 according to a control of the processor 350. For example, the power supplier 340 can include at least one of a battery, a DC/AC converter, an AC/DC converter, an AC/AC converter, and an inverter.

The processor 350 can be configured to control the overall operations of the robot 300. According to embodiments, the processor 350 can control operations of the manipulator 310, the tool 320, the memory 330, and the power supplier 340. According to embodiments, the processor 350 can include a processor having a calculation processing function. For example, the processor 350 can include a calculation processing device such as CPU (central processing unit), MCU (micro computer unit), GPU (graphics processing unit), etc., but it is not limited thereto.

The processor 350 can control operations of the manipulator 310. According to embodiments, the processor 350 can perform communication with the manipulator 310 through wired or wireless communication, and transmit to the manipulator 310 instructions indicating various operations.

According to embodiments, the processor 350 can load instructions (or a program including instructions) stored in the memory 330, and control movements of the manipulator 310 according to the execution of the loaded program. For example, the processor 350 can load a scheduler including information on operations to be performed by the robot 300, and control movements of the manipulator 310 according to the scheduler.

According to embodiments, the processor 350 can transmit to the manipulator 310 instructions for performing an operation corresponding to each step of a workflow on the basis of the workflow including a series of operations to be performed by the robot 300. The workflow can be generated and stored in advance. The processor 350 can load the workflow, and determine which operation is to be performed currently by the robot 300 on the basis of the workflow.

The processor 350 can generate instructions for rotating or moving the manipulator 310 and/or tool 320. According to embodiments, the processor 350 can generate an instruction for moving the manipulator 310 and/or tool 320 from a first point to a second point, or from and to multiple points, and transmit the generated instruction to the manipulator 310. For example, the processor 350 can calculate rotation angles for the respective joints 311, and transmit an instruction including information on the rotation angles to the manipulator 310.

The processor 350 can control operations of the memory 330. According to embodiments, the processor 350 can load data from the memory 330, or write data on the memory 330. For example, the processor 350 can load workflow data of the robot 300, a location or temporal data required for operating the robot 300 from the memory 330.

The processor 350 can control operations of the power supplier 340. According to embodiments, the processor 350 can control the power supplier 340 so that electric power of the power supplier 340 is supplied to respective components of the robot 300.

Figure 6:
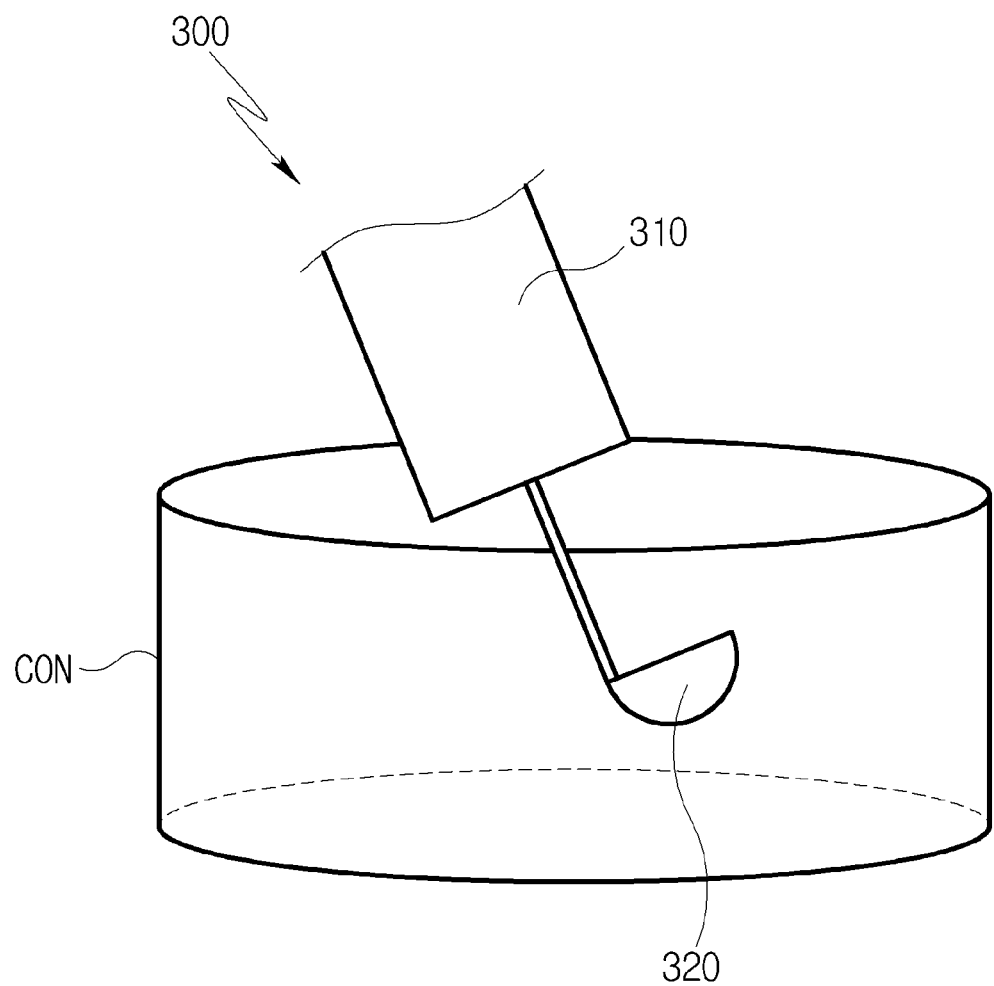
FIG. 6 is a view showing operations of the robot according to the present disclosure.

FIG. 6 is a view showing operations of the robot according to the present disclosure. Referring to FIGS. 1 to 6, the robot 300 can perform an operation within a limited space such as a container CON. According to embodiments, the manipulator 310 can move the tool 320 inside the container CON or outside of the container CON according to a control of the processor 350. For example, when the tool 320 is a ladle and the container CON is a pot, the manipulator 310 can ladle liquid of the container CON by using the tool 320. Herein, the tool 320 can be inserted into the container, pour liquid out, and output from the container CON.

Meanwhile, when the operation is performed in the above environment, the tool 320 and the container CON can become in contact causing damage on the tool 320. For example, when the tool is controlled by the manipulator 310, the tool 320 can collide within the container CON. Accordingly, the tool 320 or container CON can be damaged. To prevent such cases (e.g., to prevent collision of the tool 320 and the container CON), the processor 350 can generate a path of the manipulator 310 and/or tool 320 so as not to collide with the container CON. Nevertheless, the tool 320 can collide with the container CON due to an error range, or operation efficiency of the robot 300 reduces due to a long path.

Figure 7:
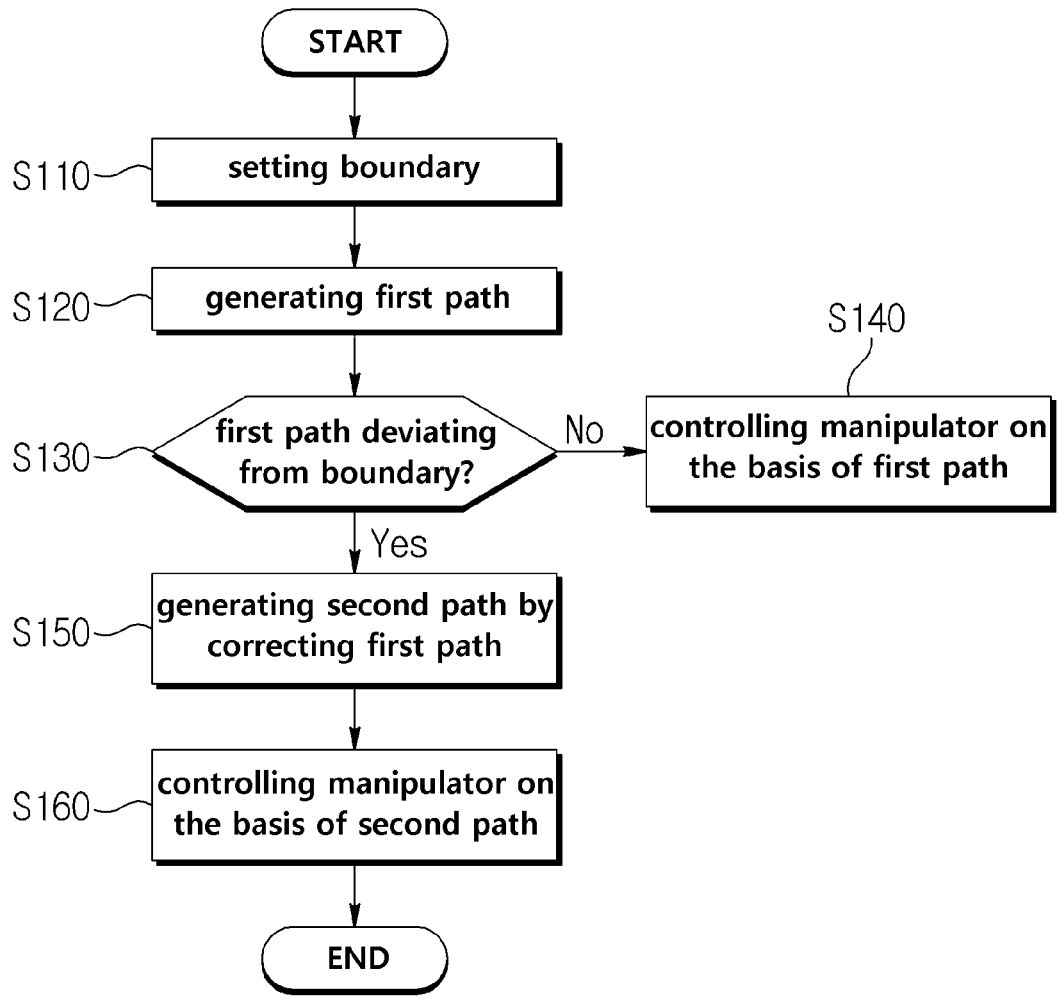
FIG. 7 is a view of a flowchart showing a control method of the robot according to embodiments of the present disclosure.

FIG. 7 is a view of a flowchart showing a control method of the robot according to embodiments of the present disclosure. A method of controlling the robot 300 shown in FIG. 7 can be performed by the processor 350 of the robot 300. In addition, the method can be employed by using instructions executable by the processor 350. The instructions can be stored in a computer readable storage medium in a program form.

Referring to FIGS. 1 to 7, in S110, the robot 300 can set a boundary. The boundary can mean a virtual region for limiting a movement range of the manipulator 310 and/or tool 320. According to embodiments, the boundary can include a plurality of regions. In the present specification, the boundary is not limited in shape. In other words, the boundary can be a surface within a space, or can be a three-dimensional figure having a volume.

The robot 300 can set a boundary on the basis of a user's input, or set a boundary on the basis of movement of the manipulator during a teaching interval. That is, the robot 300 can automatically set a boundary using an AI teaching method of determining the location of the container CON with respect to the tool 320 and/or the manipulator 310.

The processor 350 can receive coordinates of at least one point from the user (for example, through an interface, such as a touch interface or an audio-based interface), and set a boundary on the basis of the coordinates of the at least one point. According to embodiments, the processor 350 can provide a screen enabling the user to select a shape of the region (cylinder or sphere, etc.) through a display device. The user can select a shape of the region, and input coordinates of at least one point associated with the selected shape. The processor 350 can determine a boundary by using the selected shape and coordinates of the at least one point associated therewith. For example, when the shape selected by the user is a "planar surface", and coordinates of a first point, a second point, and a third point are input, the processor 350 can set a planar surface including the first to third points as a boundary. Meanwhile, in addition to a planar surface, the user can select the shape from various shapes such as pillars, cones, spheres, curved surfaces, lines, and polyhedrons, and examples of the present disclosure are not limited thereto.

In addition, processor 350 can enter a teaching interval, and set a region indicated by a location of the manipulator 310 during the teaching interval as a boundary. The teaching interval may be an operational interval where the user directly manipulates the manipulator 310. During the teaching interval, the user can input a location of the manipulator 310 to the robot 300 by moving the manipulator 310. According to embodiments, the processor 350 can monitor movements of the manipulator 310 during the teaching interval, and set a boundary by using points at which the manipulator 310 is located.

According to embodiments, the processor 350 can set a boundary by using at least a part of coordinates where points on the manipulator 310 are located during the teaching interval. For example, when a predetermined point (for example, representative point) on the manipulator 310 is located at a first point, a second point, and a third point during the teaching interval (or any number of points), the processor 350 can set a planar surface including the first point, the second point, and the third point (or any number of points) as a boundary. Additionally, the processor 350 can receive information on which type of a boundary is set from the user when setting the boundary.

In S120, the robot 300 can generate a first path. According to embodiments, the processor 350 can generate a first path for moving the manipulator 310 and/or tool 320. For example, the processor 350 can determine an execution operation associated with an execution instruction in response to the execution instruction, and generate a first path on the basis of the determined execution operation.

According to embodiments, a first path can represent a movement path of a point on the tool 320, but it is not limited thereto. For example, a first path can represent a movement path of an arbitrary point on the manipulator 310 and/or tool 320.

A first path can include information on coordinates where the manipulator 310 and/or tool 320 has to be located.

In S130, the robot 300 can determine whether or not the first path goes beyond (or deviates from) the boundary. According to embodiments, the robot 300 can determine whether or not the manipulator 310 goes beyond the boundary according to movement of the manipulator 310 on the basis of the first path. When a location of the manipulator 310 after the manipulator 310 moves according to the first path goes beyond the boundary, the robot 300 can determine that the first path goes beyond the boundary. For example, the robot 300 can perform simulation for movements of the manipulator by using the generated first path, and determine whether or not the first path goes beyond the boundary on the basis of the result of the simulation.

According to embodiments, when at least a part of the generated first path intersects with the set boundary, the robot 300 can determine that the first path goes beyond the boundary. For example, the robot 300 can determine that the first path goes beyond the boundary when the first path and the boundary intersect with each other in at least one point.

For example, the robot 300 can determine whether or not the first path goes beyond the boundary on the basis of the number of points belonging to outside of the boundary among points in the first path. Herein, determining whether to belong to outside or inside the boundary can be performed on the basis of the user's input, or on the basis of a shape of the boundary.

When it is determined that the first path does not goes beyond the boundary (S130—N), in S140, the robot 300 can control the manipulator 310 and/or tool 320 on the basis of the generated first path. According to embodiments, the robot 300 can generate an instruction by using the generated first path, and transmit the generated instruction to the manipulator 310. Accordingly, the manipulator 310 and/or tool 320 can move according to the first path.

When it is determined that the first path goes beyond the boundary (S130—Y), in S150, the robot 300 can generate a second path by correcting the first path. According to embodiments, when it is determined that the first path goes beyond the boundary, the robot 300 can generate a second path. For example, a second path can be generated on the basis of the first path. Generating a second path will be described later.

After the second path is generated, in S160, the robot 300 can control the manipulator 310 and/or tool 320 by using the second path. According to embodiments, the robot 300 can generate an instruction by using the generated second path, and transmit the generated instruction to the manipulator 310. Accordingly, the manipulator 310 and/or tool 320 can move according to the second path. As described above, the second path is a path that does not go beyond the boundary, and thus the manipulator 310 and/or tool 320 can move within the boundary, and the possibility where manipulator 310 and/or tool 320 collides with other objects outside the boundary can be reduced.

In other words, the second path means a path where the manipulator 310 and/or tool 320 moves without colliding with the boundary. For example, the second path can be a collision-free path.

Figure 8:
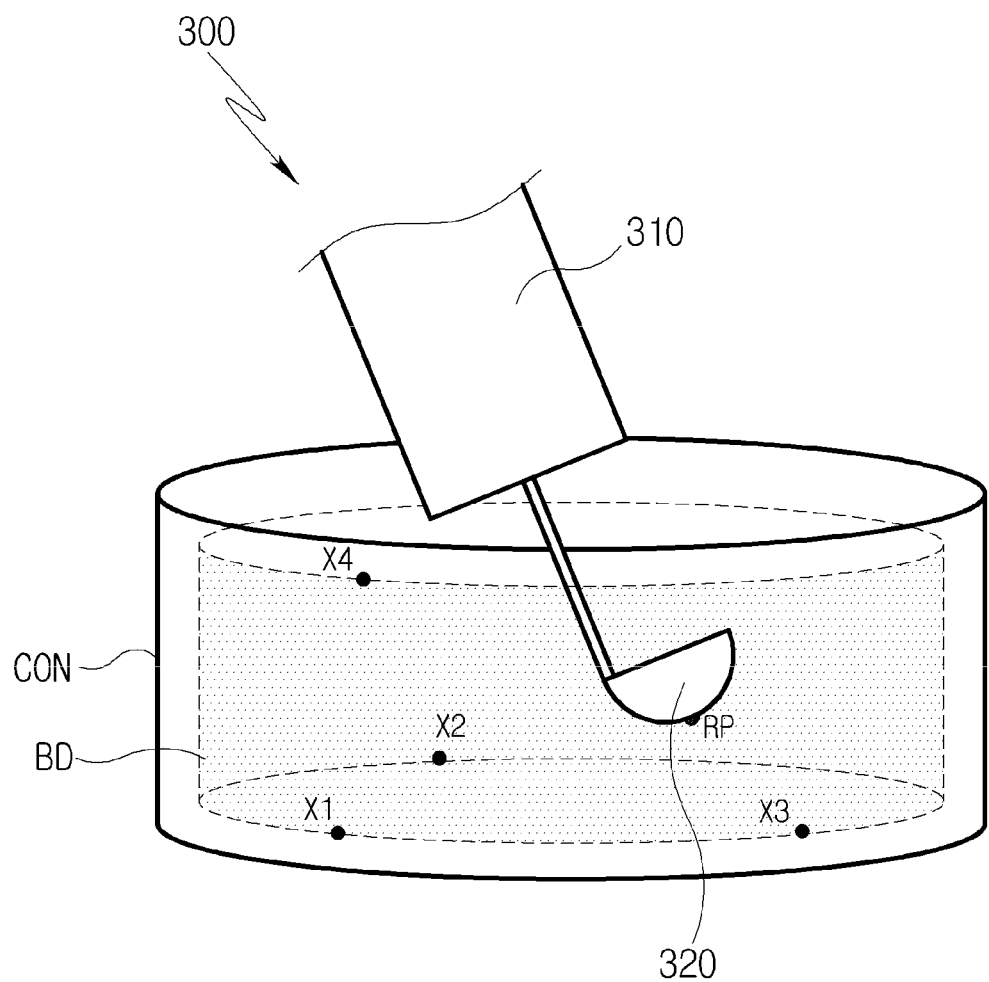
FIG. 8 is a view showing a boundary according to embodiments of the present disclosure.

FIG. 8 is a view showing a boundary according to embodiments of the present disclosure. Referring to FIGS. 1 to 8, a boundary BD can mean a virtual region for limiting a movement range of the manipulator 310 and/or tool 320. Although a boundary BD is disposed inside the container CON in FIG. 8, embodiments of the present disclosure are not limited to the shape or location of the boundary BD. That is, the BD may be disposed at different portions of the container CON, or may be located outside of the container CON, such as a predetermine distance from a top surface of the container CON to avoid collision between the manipulator and/or tool 320.

The robot 300 or processor 350 can set a boundary BD on the basis of a user's input, or set a boundary on the basis of movement of the manipulator during a teaching interval. According to embodiments, the robot 300 can set a boundary BD by using at least one point used for defining the boundary BD, and the at least one point can be input from the user or from movements of the manipulator 310 during the teaching interval.

As shown in FIG. 8, when a shape of the boundary BD is a cylinder, the boundary BD can be defined by four points X1, X2, X3, and X4. For example, the bottom surface of the cylinder can be defined by three points X1, X2, and X3, and the height of the cylinder can be defined by one point X4. However, the bottom surface of the cylinder and the top surface of the cylinder may be defined by any number of points. Further, the boundary BD may have any shape, such as a square or rectangular, including any shape that corresponds to a shape of the container CON.

According to embodiments, the robot 300 can receive coordinates of the four points X1, X2, X3, and X4 from the user through an input interface, and set the boundary BD by using the input coordinates of the four points X1, X2, X3, and X4. Herein, information indicating that a shape of the boundary BD is a cylinder can be additionally input to the robot 300.

According to embodiments, according to user's manipulation during a teaching interval, a predetermined point, among points of the manipulator 310, (for example, a point P) can be sequentially located on the four points X1, X2, X3, and X4, and the robot 300 can detect that the point P is sequentially located on the four points X1, X2, X3, and X4 according to the movement of the manipulator 310 during the teaching interval. According to the detection result, the robot 300 can set the boundary BD by using coordinates of the four points X1, X2, X3, and X4. Herein, information indicating that a shape of the boundary BD is a cylinder can be additionally input to the robot 300.

In the present specification, a method of setting a boundary BD is not limited to the method described with reference to FIG. 8. It should be understood that the boundary BD can be set in various ways.

Figure 9:
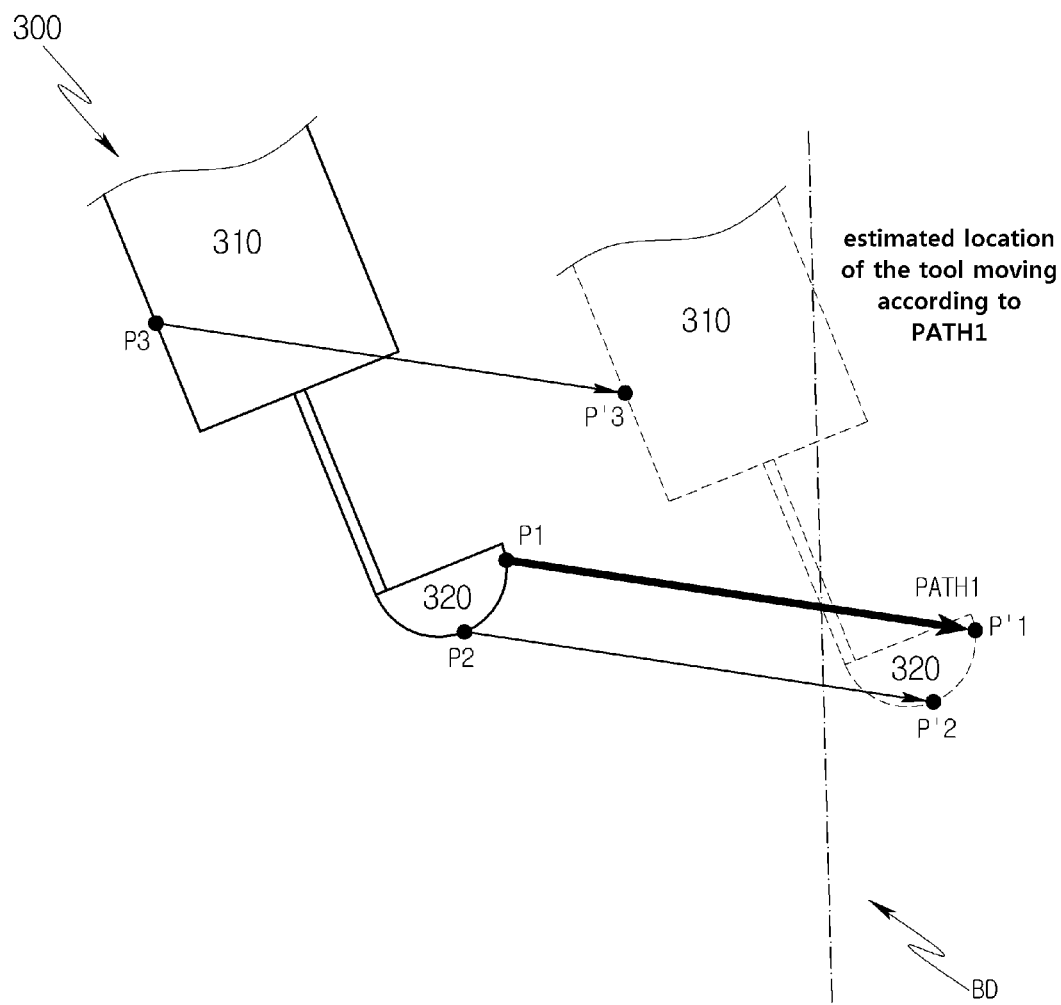
FIG. 9 is a view showing of determining whether or not a first path goes beyond a boundary according to embodiments of the present disclosure.

FIG. 9 is a view showing of determining whether or not a first path goes beyond a boundary according to embodiments of the present disclosure. Referring to FIGS. 1 to 9, it is assumed that a first path PATH1 is generated by the robot 300, and the first path PATH1 represents a movement path of a first point P1 on the tool 320.

The robot 300 can determine whether or not the first path PATH1 goes beyond a boundary BD on the basis of the first path PATH1 and the boundary BD. According to embodiments, when at least a part of the first path PATH1 intersects with the boundary BD, the robot 300 can determine that the first path PATH1 goes beyond the boundary BD. For example, when the first path PATH1 and the boundary BD intersect with each other in at least one point, the robot 300 can determine that the first path PATH1 goes beyond the boundary BD.

According to embodiments, the robot 300 can calculate a location of the manipulator 310 according to the first path PATH1, and according to the calculation result, determine whether or not the first path PATH1 goes beyond the boundary BD on the basis of the location (for example, based on coordinates) of the manipulator 310 having moved according to the first path PATH1, and a location (for example, based on coordinates) of the boundary. In other words, the robot 300 can determine whether or not the first path PATH1 goes beyond the boundary BD by performing calculation such as simulation before the manipulator 310 practically moves according to the first path PATH1.

The robot 300 can calculate a location of the manipulator 310 that will move according to the first path PATH1, and when the location of the manipulator 310 that will move goes beyond the boundary BD, the robot 300 can determine that the first path PATH1 goes beyond the boundary BD. For example, when at least a part of the manipulator 310 that will move according to the first path PATH1 intersects with the boundary BD, the robot 300 can determine that the first path PATH1 goes beyond the boundary BD.

According to embodiments, the robot 300 can calculate coordinates of points on the manipulator 310 after the manipulator 310 moves according to the first path PATH1, and determine whether or not the first path PATH1 goes beyond the boundary BD on the basis of the number of points where the first path PATH1 and the boundary BD intersect with each other or on the basis of locations of the intersecting points according to the result of the calculation when the manipulator 310 moves according to the first path PATH1. For example, when the manipulator 310 moves according to the first path PATH1, the robot 300 can determine that the first path PATH1 goes beyond the boundary BD when the point intersecting with the boundary BD is located on the tool 320 or when the number of intersecting points is equal to or greater than the reference number.

In a case show in FIG. 9, at least a part of the manipulator 310 that will move according to the first path PATH1 intersects with the boundary BD, and thus the robot 300 can determine that the first path PATH1 goes beyond the boundary BD.

In addition, the robot 300 can calculate that points P1, P2 P3 on the manipulator 310 respectively move to points P'1, P'2, P'3. The robot 300 can estimate that two points P1 and P2, among three points, intersect with the boundary BD by using the calculation result, and thus the robot 300 can determine that the first path PATH1 goes beyond the boundary BD.

Figure 10:
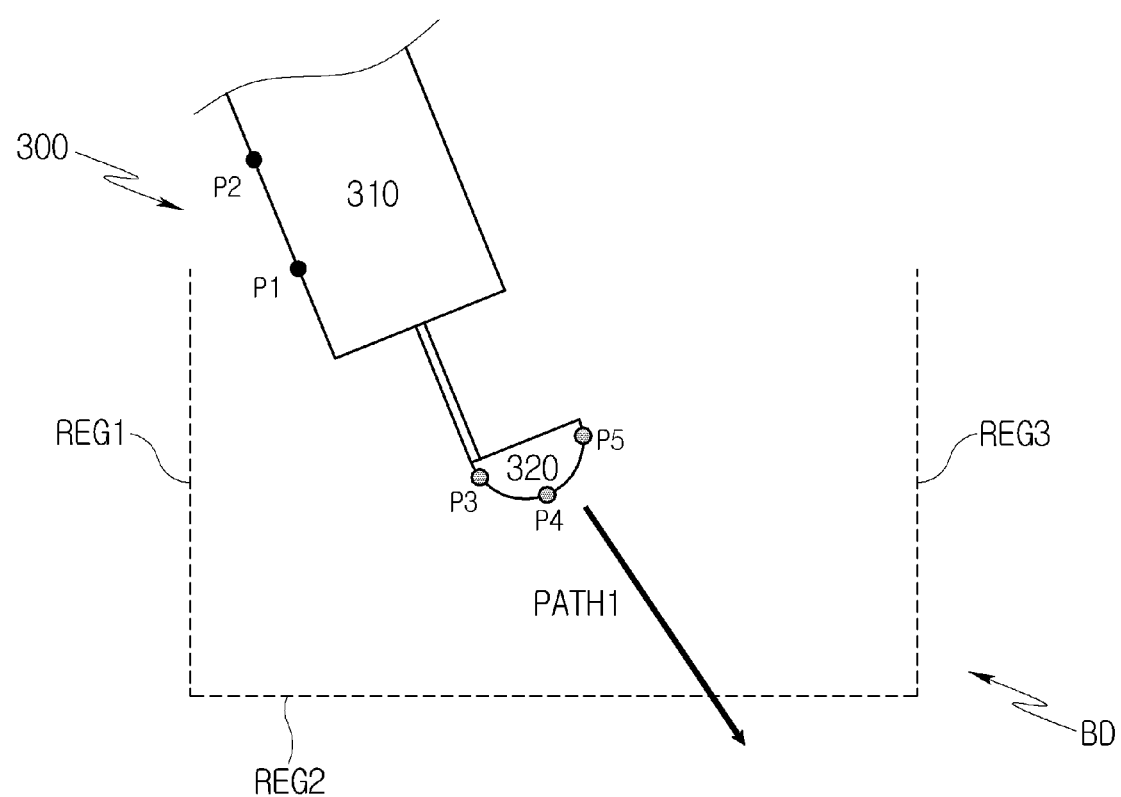
FIG. 10 is a view showing a first path and a boundary according to embodiments of the present disclosure.

FIG. 10 is a view showing a first path and a boundary according to embodiments of the present disclosure. Referring to FIGS. 1 to 10, a boundary BD can include a plurality of regions REG1 to REG3. In FIG. 9, a first region REG1, a second region REG2, and a third region REG3 can be included in the boundary BD. A first path PATH1 can be generated by the robot 300.

The robot 300 can select a representative region from the regions included in the boundary BD, or select a plurality of representative points on the manipulator 310 and/or tool 320. Subsequently, the robot 300 can determine whether or not the first path PATH1 goes beyond a boundary BD on the basis of the representative region and the representative points. For example, the robot 300 can determine whether or not the first path PATH1 goes beyond a boundary BD on the basis of a location of the representative region and locations of the representative points.

In other words, the robot 300 reduces an amount of calculation by using the representative region and the representative points. Accordingly, a resource required for determining whether or not the first path PATH1 goes beyond the boundary BD can be reduced.

The robot 300 can determine a representative region on the basis of locations between the regions REG1 to REG3 included in the boundary BD and the first path PATH1. According to embodiments, a representative region can mean a region, among the regions REG1 to REG3 included in the boundary BD, which becomes close to the manipulator 310 and/or tool 320 under a situation where the manipulator 310 and/or tool 320 moves according to the first path PATH1. In a case of FIG. 10, according to a first path PATH1, the robot 300 can determine a second region REG2 and a third region REG3 as representative regions. Accordingly, the robot 300 can use the second region REG2 and the third region REG3, excluding a first region REG1, when determining whether or not the first path PATH1 goes beyond a boundary BD.

The robot 300 can determine representative points on the basis of locations between points on the manipulator 310 and/or tool 320 and the boundary BD. According to embodiments, the robot 300 can determine points, among points P1 to P5 on the manipulator 310 and/or tool 320, which are relatively close to the boundary BD as representative points. For example, representative points can mean points, among points P1 to P5, which are within a reference distance with the boundary BD.

Further, the robot 300 can determine a representative point on the basis of locations between points on the manipulator 310 and/or tool 320 and the representative region. The robot 300 can determine points, among points P1 to P5 on the manipulator 310 and/or tool 320, which are relatively close to the determined representative region as representative points. For example, representative points can mean points, among points P1 to P5, which are within a reference distance with the boundary BD.

According to embodiments, the tool 320 can be attached to an end part of the manipulator 310, and points on the tool 320 can be determined as representative points according thereto. In a case of FIG. 10, the robot 300 can determine points P3 to P5 as representative points.

Figure 11:
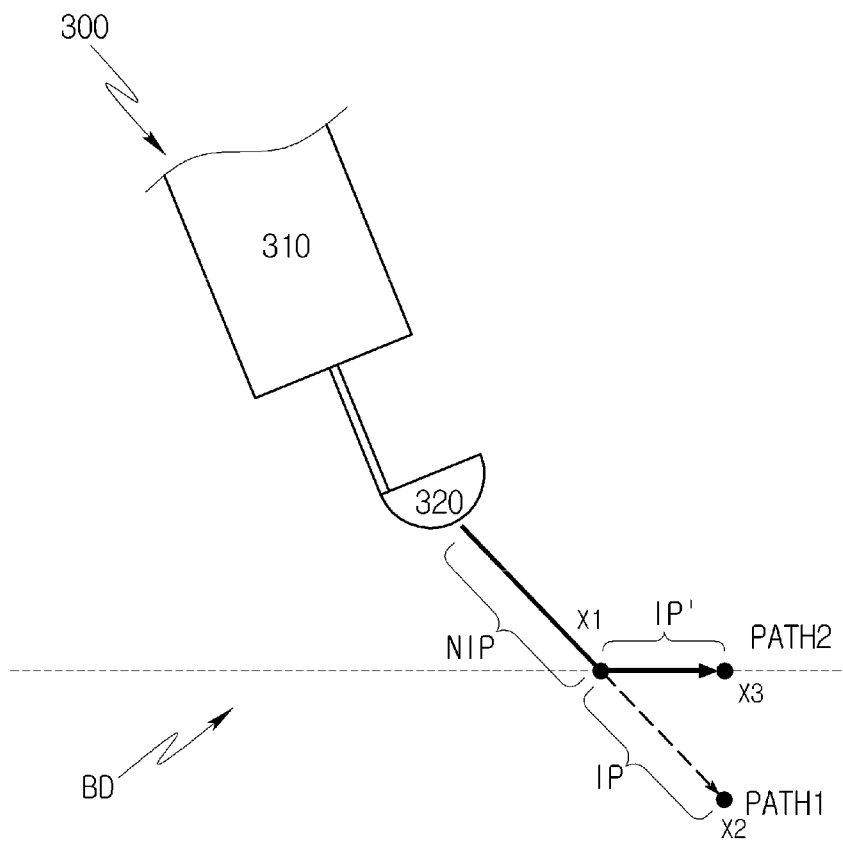
FIG. 11 is a view showing of generating a second path by correcting a first path according to embodiments of the present disclosure.

FIG. 11 is a view showing of generating a second path by correcting a first path according to embodiments of the present disclosure. Referring to FIGS. 1 to 11, the robot 300 can generate a second path PATH2 that does not go beyond a boundary BD by correcting a first path PATH1 when it is determined that the first path PATH1 goes beyond the boundary BD. According to embodiments, the robot 300 can generate a second path PATH2 on the basis of a first path PATH1 and a boundary BD. For example, the second path PATH2 can be a path where a part thereof is identical to the first path PATH1 and the remaining part thereof extend along with the boundary BD. In the present specification, a specific path extending along with the boundary BD means that the specific path extends along with a curvature of a surface of the boundary BD.

According to embodiments, the manipulator 310 controlled on the basis of the second path PATH2 can perform first movement where the manipulator 310 moves such that a distance between the tool 320 and the boundary BD exceeds the reference distance, and second movement where the manipulator 310 moves such that a distance between the tool 320 and the boundary BD is maintained within the reference distance and moves along the boundary BD.

The robot 300 can generate a second path PATH2 by correcting the first path PATH1 such that a part thereof that goes beyond the boundary BD extends along with the boundary BD. According to embodiments, the robot 300 can generate a second path PATH2 by using the first path PATH1, and a result of projecting the first path PATH1 onto the boundary BD.

According to embodiments, the robot 300 can generate a second path PATH2 on the basis of a path IP' obtained by projecting a part, which goes beyond the boundary BD, of the first path PATH1 onto the boundary BD, and a part NIP, which does not go beyond the boundary BD, of the first path PATH1. For example, from the first path PATH1, the robot 300 can calculate a path IP' obtained by projecting a part IP, which goes beyond the boundary BD, onto the boundary BD by using a vector of each part of the boundary BD.

According to embodiments, among points on the first path PATH1, the robot 300 can generate a second path PATH2 by using a point X3 obtained by projecting an end point X2 of the first path PATH1 onto the boundary BD, and a point X1 that becomes in contact with the boundary BD. For example, the robot 300 can generate a second path PATH2 passing through the points X1 and X3, and the generated second path PATH2 does not go beyond the boundary (that is, the second path PATH2 is within the boundary). The robot 300 can calculate a point X3 by projecting the end point X2 of the first path PATH1 onto the boundary BD by using a vector of each part of the boundary BD.

Meanwhile, in FIG. 11, a boundary BD may be a planar surface. Embodiments according to the present disclosure are not limited to the shape of the boundary BD, and can be applied to various types of the boundary BD. For example, a boundary BD having an arbitrary shape can be divided into small patches (or regions), and each of the patches can be approximated (e.g., through calculation) into a planar surface.

Accordingly, when the manipulator 310 moves according to the second path PATH2, the manipulator 310 moves in a path identical to the first path unit the manipulator 310 arrives the boundary BD, and moves along the boundary BD after the manipulator 310 arrives the boundary BD.

Figure 12:
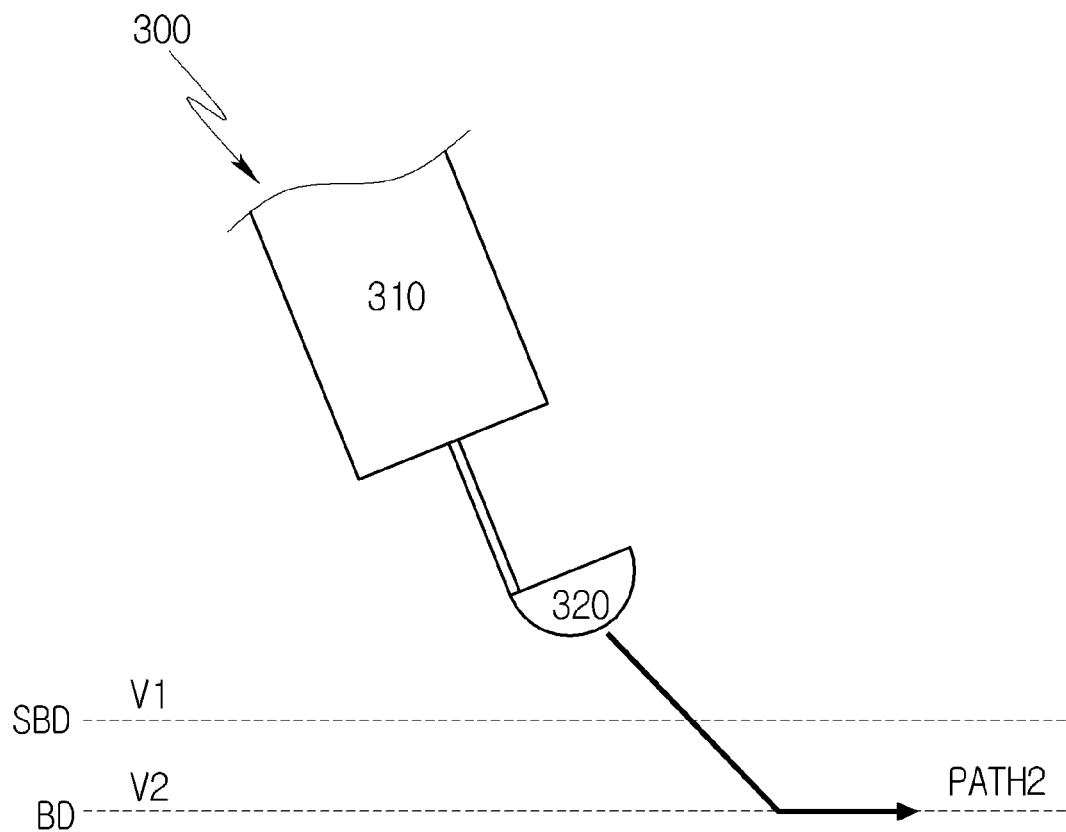
FIG. 12 is a view showing a method of controlling the manipulator by using a plurality of boundaries according to embodiments of the present disclosure.

FIG. 12 is a view showing a method of controlling the manipulator by using a plurality of boundaries according to embodiments of the present disclosure. Referring to FIGS. 1 to 12, the robot 300 can set a sub-boundary SBD in addition to a boundary BD. According to embodiments, the sub-boundary SBD can be located within the boundary BD, but it is not limited thereto.

As described above, when it is determined that a first path PATH1 goes beyond a boundary BD, the robot 300 can generate a second path PATH2 that does not go beyond the boundary BD by correcting the first path PATH1, and control the manipulator 310 on the basis of the generated second path PATH2.

The robot 300 can additionally set a sub-boundary SBD, and when the manipulator 310 moves according to the second path PATH2, the robot 300 can decrease a velocity of the manipulator 310 when manipulator 310 arrives (or goes beyond) the sub-boundary SBD. According to the present disclosure, the robot 300 can control movements of the manipulator 310 such that the manipulator 310 does not go beyond a boundary by using a second path PATH2, and thus the second path PATH2 can become crooked around the boundary BD. That is, the second path PATH2 may follow the boundary and may be at the boundary, or may be partially spaced from the boundary. Accordingly, the sub-boundary SBD is additionally set in addition to the boundary, and a velocity of the manipulator 310 is reduced before arriving the BD boundary BD, and thus the manipulator 310 stably moves along the second path PATH2.

For example, as shown in FIG. 12, the robot 300 can control the manipulator 310 on the basis of the second path PATH2, control a velocity of the manipulator 310 to maintain a first velocity V1 before the manipulator 310 arrives a sub-boundary SBD, and control the velocity of the manipulator 310 to maintain a second velocity V2 after the manipulator 310 arrives a sub-boundary SBD. According to embodiments, the second velocity can be lower than the first velocity, but it is not limited thereto.

Figure 13:
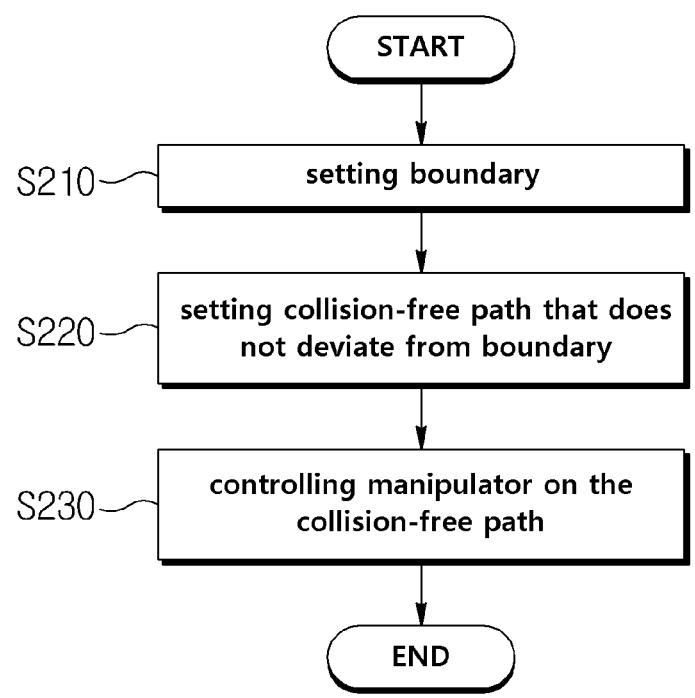
FIG. 13 is a view of a flowchart showing a control method of the robot according to embodiments of the present disclosure.

FIG. 13 is a view of a flowchart showing a control method of the robot according to embodiments of the present disclosure. A method of controlling the robot 300 shown in FIG. 13 can be performed by the processor 350 of the robot 300. In addition, the method can be employed by using instructions executable by the processor 350. The instructions can be stored in a computer readable storage medium in a program form.

Referring to FIGS. 1 to 13, in S210, the robot 300 can set a boundary. The boundary can mean a virtual region for limiting a movement range of the manipulator 310 and/or tool 320.

In S220, the robot 300 can generate a collision-free path that does not go beyond the boundary BD. According to embodiments, the processor 350 can determine an execution operation associated with an execution instruction, and generate a collision-free path on the basis of the determined execution operation and information on the boundary BD. For example, the processor 350 can generate a collision-free path where a distance between the manipulator 310 and the boundary BD becomes equal to or greater than a preset reference distance on the basis of a location (for example, coordinates) of the manipulator 310 and a location (for example, coordinates) of the boundary BD.

For example, the processor 350 can preferentially generate a preliminary path, and generate a collision-free path that does not go beyond the boundary BD by using the generated preliminary path and information on the boundary BD. Herein, the preliminary path can be a first path PATH1 described with reference to FIGS. 7 to 11, and the collision-free path can be a second path PATH2 described with reference to FIGS. 7 to 11, but it is not limited thereto. In S230, the robot 300 can control the manipulator 310 and/or tool 320 by using the collision-free path. According to embodiments, the robot 300 can generate an instruction by using the generated collision-free path, and transmit the generated instruction to the manipulator 310. Accordingly, the manipulator 310 and/or tool 320 can move according to the collision-free path. As described above, the collision-free path is a path that does not go beyond the boundary, and thus the manipulator 310 and/or tool 320 can move within the boundary, and the possibility where manipulator 310 and/or tool 320 collides with other objects outside the boundary can be reduced.

According to embodiments, the manipulator 310 moving on the basis of the collision-free path can move while a distance between the tool 320 and the boundary BD is maintained to be equal to or greater than a reference distance. For example, when the manipulator 310 moves on the basis of the collision-free path, the manipulator 310 can perform first movement where the manipulator 310 moves such that a distance between the tool 320 and the boundary BD exceeds a reference distance, and second movement where the manipulator 310 moves along the boundary while the distance between tool 320 and the boundary BD is maintained the reference distance.

According to embodiments of the present disclosure, the robot 300 performs operations within a set boundary range, and thus the possibility of damage or breakage of the robot 300 due to a collision with an object around the robot 300 can be reduced.

According to embodiments of the present disclosure, the robot 300 performs operations within the boundary while not going beyond the set boundary, and thus the efficiency of operational movements of the robot can be improved.

Figure 14:
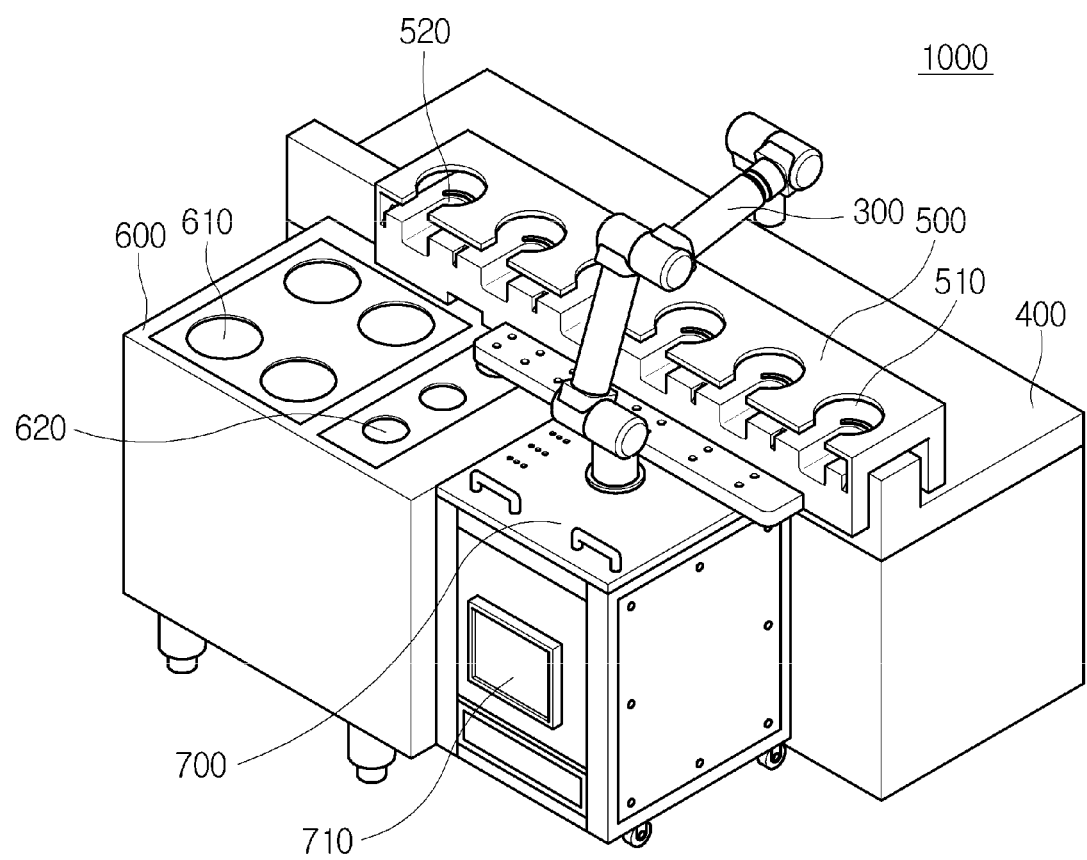
FIGS. 14 and 15 are views showing a robot system including a robot according to embodiments of the present disclosure.
Figure 15:
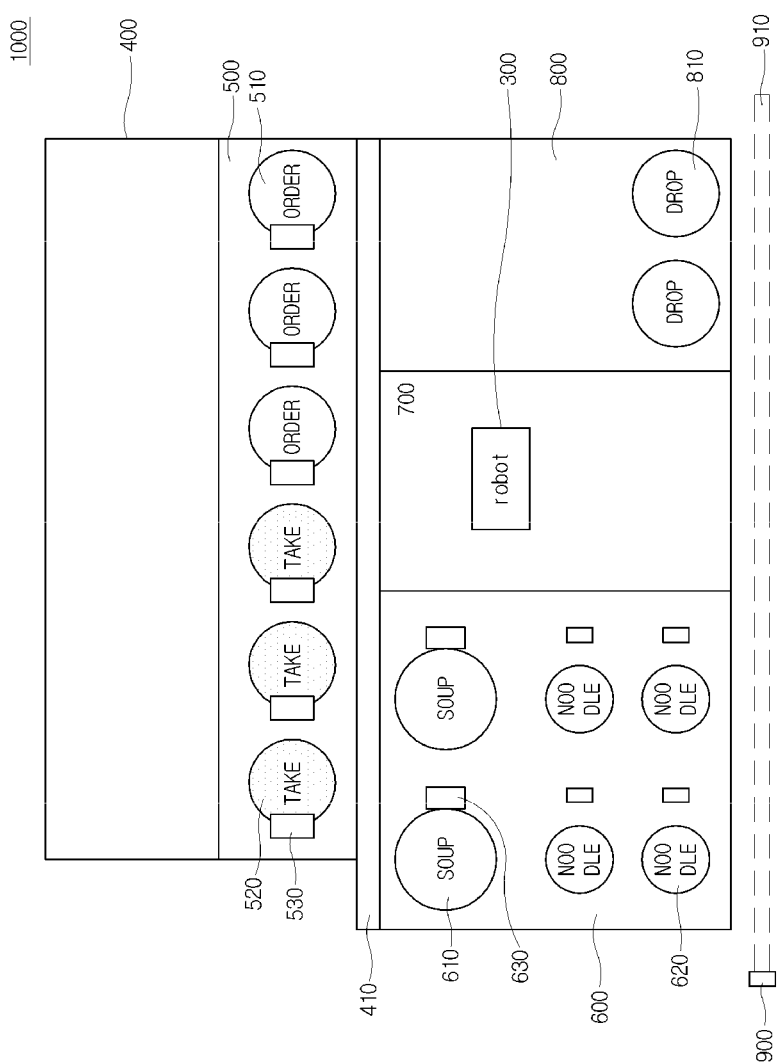

FIGS. 14 and 15 are views showing a robot system including a robot according to embodiments of the present disclosure. Referring to FIGS. 14 and 15, the robot system 1000 may refer to a system that is capable of cooking foods by using the robot 300 and providing the foods to consumers or users.

The robot system 1000 may include a serving space 400, a preparation space 500, a work space 600, a robot space 700, an auxiliary space 800, and a safety sensor 900. The spaces 400, 500, 600, 700, and 800 described in FIGS. 14 and 15 may refer to spaces defined by a structure such as a table.

The serving space 400 may refer to a space in which prepared foods are arranged. According to embodiments, the robot 300 may move a bowl of the cooked food to the serving space 400.

The preparation space 500 may refer to a space in which bowls to be cooked and bowls of cooked foods are arranged. According to embodiments, the preparation space 500 may include an order space 510 in which bowls to be cooked are arranged, and a reception space 520 in which bowls of cooked foods are arranged.

Further, the preparation space 500 may include a detection sensor 530 placed near the order space 510 and the reception space 520. The detection sensor 530 may detect whether the bowl is placed in the order space 510 and the reception space 520, and may generate a result of the detection. That is, when the bowl is placed in the order space 510 and the reception space 520, the detection sensor 530 generates a detection value indicating that the bowl is placed. The robot 300 may identify a state of arrangement of the bowls on the order space 510 and the reception space 520 by using the detection value.

For example, the detection sensor 530 may be any one among an infrared sensor, a camera, a proximity sensor, a limit sensor, and a weight sensor, but it is not limited thereto.

According to embodiments, when the detection sensor 530 detects that the bowl is placed in the order space 510, the robot 300 moves the bowls to be cooked and cooks using the ingredients contained in the bowls to be cooked.

The robot 300 may move the bowl of cooked food to the reception space 520. Herein, in the reception space 520, the bowl of cooked food may be placed in the space except for the space in which bowls are arranged. Further, when the detection sensor 530 detects that a predetermined time has elapsed since a bowl was placed in the reception space 520, the robot 300 discards the contents contained in the bowl in which the predetermined time has elapsed since the bowl was placed.

The cooking space 600 may refer to a space in which cooking is performed by the robot 300. According to embodiments, the cooking space 600 may include a soup cooking zone 610 and a noodle cooking zone 620.

The soup cooking zone 610 may refer to a zone in which a soup container is placed and the soup is cooked. According to embodiments, the robot 300 may move the manipulator to the soup cooking zone 610 and may use the manipulator to ladle the soup contained in the soup container.

The noodle cooking zone 620 may refer to a zone in which noodles are boiled. According to embodiments, the robot 300 may move the manipulator to the noodle cooking zone 620, may drop noodles into the noodle cooking zone 620, and may ladle the boiled noodle using the manipulator.

For example, the width of the noodle cooking zone 620 may be smaller than that of the soup cooking zone 610, but it is not limited thereto.

The cooking space 600 may further include a tool holder 630 on which the tools 320 may be arranged. The tool holder 630 may have various tools arranged. The robot 300 may move the manipulator to the tool holder 630 and may then combine the tool 320 with the manipulator. The tool holder 630 may be placed at each of the cooking zones 610 and 620.

In the meantime, the serving space 400 and the cooking space 600 may be connected via a space connection member 410.

The robot space 700 may refer to a space in which the robot 300 is provided. According to embodiments, the robot space 700 may be provided with a controller 710 for controlling the robot 300. According to embodiments, the controller 710 may include the processor 350 of the robot 300, but it is not limited thereto.

The auxiliary space 800 may be placed at a side of the robot space 700. According to embodiments, the auxiliary space 800 may be a physical wall for protecting from the movement of the robot 300.

According to embodiments, the auxiliary space 800 may include a disposal zone 810 in which the foods are discarded. The robot 300 may use the manipulator to discard the garbage, etc. generated during the cooking process, into the disposal zone 810. As described above, when the detection sensor 530 detects that the predetermined time has elapsed since a bowl was placed in the reception space 520, the robot 300 drops, into the disposal zone 810, the contents contained in the bowl in which the predetermined time has elapsed since the bowl was placed.

The safety sensor 900 may set a safety region 910 of the robot 300. According to embodiments, the safety sensor 900 may be a vision sensor such as a camera or a lidar, and may detect whether an obstacle invades the preset safety region 910.

When the safety sensor 900 detects that an obstacle invades the preset safety region 910, the processor 350 or the controller 710 for controlling the robot 300 stops the robot 300 for emergency, based on the result of the detection from the safety sensor 900.

The control method of the robot or operation method of the processor according to embodiments of the present disclosure can be stored in a computer readable storage medium so as to be employed in commands executable by the processor.

The storage medium can include a database, including distributed database, such as a relational database, a non-relational database, an in-memory database, or other suitable databases, which can store data and allow access to such data via a storage controller, whether directly and/or indirectly, whether in a raw state, a formatted state, an organized stated, or any other accessible state. In addition, the storage medium can include any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium.

Although some embodiments have been disclosed above, it should be understood that these embodiments are given by way of illustration only, and that various modifications, variations, and alterations can be made without departing from the spirit and scope of the present disclosure. Therefore, the scope of the present invention should be limited only by the accompanying claims and equivalents thereof.

What is claimed is:

1. A robot comprising:
   a manipulator configured to move a tool; and
   a processor configured to control the manipulator by:
      setting a boundary having a three-dimensional shape,
      generating a first path in response to a received execution instruction,
      in response to the generated first path extending beyond the boundary, generating a second path that does not extend beyond the boundary based on the first path and the boundary, and
      controlling the manipulator based on the second path,
   wherein the processor determines a representative region among regions included in the boundary, and determines whether or not the first path goes beyond the boundary based on the first path and the representative region,
   wherein the processor determines a region, among the regions, that becomes closest to the tool as the representative region, when the tool moves according to the first path,
   wherein the processor determines representative points on an outer surface of the tool, and determines whether or not the first path goes beyond the boundary based on a location of the representative points that will move according to the first path and a location of the representative region,
   wherein the three-dimensional shape comprises at least one of a cylinder, a pillar, a cone, a sphere, and a shape having a curved surface, and
   wherein a portion of the second path is set to extend along a curvature of a surface of the boundary, and maintain a reference distance from the boundary.

2. The robot of claim 1, wherein the processor sets the boundary based on at least one of information on coordinates input from a user, and information on coordinates input by the manipulator during a teaching interval.

3. The robot of claim 1, wherein the processor is further configured to:
   determine an execution operation to be performed by the robot based on the received execution instruction,
   generate, based on the determined execution operation, the first path for moving from a first point to a second point through a plurality of stopover points, and
   determine, based on information of the first path, whether the first path extends beyond the boundary, and wherein the information of the first path comprises information on movement coordinates and information on rotation angles of joints of the robot at the plurality of stopover points.

4. The robot of claim 1, wherein the execution operation comprises a cooking operation,
wherein the tool is a cooking tool, and
wherein the first path is a path for moving the cooking tool.

5. The robot of claim 1, wherein the processor determines that the first path goes beyond the boundary when the first path intersects with the boundary.

6. The robot of claim 1, wherein the processor performs simulation for the manipulator moving according to the first path, and
when at least a part of the manipulator intersects with the boundary according to a result of the simulation, the processor determines that the first path goes beyond the boundary.

7. The robot of claim 1, wherein when the first path extends beyond the boundary, the processor generates the second path by correcting the first path so that a part of the first path, which goes beyond the boundary, is changed to extend along the boundary.

8. The robot of claim 1, wherein the processor is further configured to:
set a preliminary boundary, and
when the manipulator moves according to the second path, control the manipulator to move at a first velocity before the tool moves beyond the preliminary boundary, and control the manipulator to move at a second velocity after the tool moves beyond the preliminary boundary, the second velocity being less than the first velocity.

9. The robot of claim 1, wherein a shape of the boundary is a cylinder and a bottom surface of an interior of the cylinder is defined by at least one point and a top surface of the interior of the cylinder is defined by at least one point.

10. A method of controlling a robot, wherein the robot includes a manipulator and a tool attached to the manipulator, the method comprising:
setting a boundary having a three-dimensional shape;
generating a first path in response to receiving an execution instruction;
determining whether or not the generated first path extends beyond the boundary;
in response to the generated first path extending beyond the boundary, generating a second path that does not extend beyond the boundary based on the first path and the boundary; and
controlling the manipulator based on the second path,
wherein the determining of whether or not the generated first path extends beyond the boundary comprises:
determining a representative region among regions included in the boundary; and
determining whether or not the first path goes beyond the boundary based on the first path and the representative region,
wherein the determining of the representative region among regions included in the boundary comprises determining a region, among the regions, that becomes closest to the tool as the representative region, when the tool moves according to the first path,
wherein the determining whether or not the first path goes beyond the boundary includes determining representative points on an outer surface of the tool, and determines whether or not the first path goes beyond the boundary based on a location of the representative points that will move according to the first path and a location of the representative region,
wherein the three-dimensional shape comprises at least one of a cylinder, a pillar, a cone, a sphere, and a shape having a curved surface, and
wherein a portion of the second path is set to extend along a curvature of a surface of the boundary, and maintain a reference distance from the boundary.

11. The method of claim 10, wherein the setting of the boundary includes:
setting the boundary based on at least one of information on coordinates input from a user, and information on coordinates input by the manipulator during a teaching interval.

12. The method of claim 10, wherein the generating the first path in response to receiving the execution instruction comprises:
determining an execution operation to be performed by the robot based on the received execution instruction; and
generating, based on the determined execution operation, the first path for moving from a first point to a second point through a plurality of stopover points,
wherein the determining of whether or not the generated first path extends beyond the boundary comprises determining, based on information of the first path, whether the first path goes beyond the boundary, and
wherein the information of the first path comprises information on movement coordinates and information on rotation angles of joints of the robot at the plurality of stopover points.

13. The method of claim 12, wherein the execution operation comprises a cooking operation, and
wherein the tool is a cooking tool, and
wherein the first path is a path for moving the cooking tool.

14. The method of claim 10, wherein the generating of the second path includes:
generating the second path by correcting the first path so that a part of the first path, which extends beyond the boundary, is changed to extend along the boundary.

15. The method of claim 14, further comprising:
setting a preliminary boundary; and
when the manipulator moves according to the second path, controlling the manipulator to move at a first velocity before the tool moves beyond the preliminary boundary, and controlling the manipulator to move at a second velocity after the tool moves beyond the preliminary boundary.

16. The method of claim 10, wherein a shape of the boundary is a cylinder and a bottom surface of an interior of the cylinder is defined by at least one point and a top surface of the interior of the cylinder is defined by at least one point.

* * * * *